United States Patent
Twombly et al.

(10) Patent No.: US 10,798,007 B2
(45) Date of Patent: *Oct. 6, 2020

(54) DATA TRANSFER, OVER SESSION OR CONNECTION, AND BETWEEN COMPUTING DEVICE AND SERVER ASSOCIATED WITH A ROUTING NETWORK FOR MODIFYING ONE OR MORE PARAMETERS OF THE ROUTING NETWORK

(71) Applicant: Bank of America Corporation, Charlotte, NC (US)

(72) Inventors: Steven M. Twombly, Saco, ME (US); Matthew Murphy, Charlotte, NC (US); Mark Williams, Thornton, PA (US); Bradley Holland, Huntersville, NC (US); Mark A. Nelson, Waxhaw, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/574,410

(22) Filed: Sep. 18, 2019

(65) Prior Publication Data

US 2020/0014627 A1  Jan. 9, 2020

Related U.S. Application Data

(63) Continuation of application No. 15/477,830, filed on Apr. 3, 2017, now Pat. No. 10,601,718.

(51) Int. Cl.
*H04L 12/721* (2013.01)
*H04L 12/851* (2013.01)
(Continued)

(52) U.S. Cl.
CPC ........ *H04L 47/24* (2013.01); *H04L 29/06319* (2013.01); *H04L 41/28* (2013.01);
(Continued)

(58) Field of Classification Search
CPC ............ G06Q 30/0233; G06Q 30/0236; H04L 12/40163; H04L 12/5689; H04L 47/805;
(Continued)

(56) References Cited

U.S. PATENT DOCUMENTS

| | | |
|---|---|---|
| 6,597,957 B1 | 7/2003 | Beakley |
| 6,804,201 B1 | 10/2004 | Gelenbe |

(Continued)

FOREIGN PATENT DOCUMENTS

| | | |
|---|---|---|
| EP | 1096808 A2 | 5/2001 |
| EP | 3306900 A1 | 4/2018 |

OTHER PUBLICATIONS

Apr. 18, 2018—U.S. Office Action—U.S. Appl. No. 15/477,803.
(Continued)

*Primary Examiner* — Salvador E Rivas
(74) *Attorney, Agent, or Firm* — Banner & Witcoff, Ltd.; Michael A. Springs

(57) ABSTRACT

A method, apparatus, computer-readable medium, and/or system may comprise a user device configured to transmit, to a computing device, data indicative of a first routing network and data indicative of a second routing network. The computing device may comprise a processor and memory storing computer-executable instructions that, when executed by the processor, cause the computing device to receive, from the user device, the data indicative of the first routing network and the data indicative of the second routing network. The computing device may determine, based on the data indicative of the first routing network, a plurality of parameters for the first routing network. The
(Continued)

computing device may determine, based on the data indicative of the second routing network, a plurality of parameters for the second routing network. The computing device may generate a secure session connection between the computing device and a server associated with the second routing network. The computing device may receive, from the server and via the secure session connection between the computing device and the server associated with the second routing network, a modification to one or more parameters of the plurality of parameters for the second routing network. The computing device may determine priorities for the first routing network and the second routing network based at least in part on the plurality of parameters for the first routing network and the modification to the one or more parameters of the plurality of parameters for the second routing network. The computing device may store, at a database, the priorities for the first routing network and the second routing network.

20 Claims, 9 Drawing Sheets

(51) Int. Cl.
  *H04L 29/08* (2006.01)
  *H04L 29/06* (2006.01)
  *H04Q 11/00* (2006.01)
  *H04L 12/26* (2006.01)
  *H04L 12/24* (2006.01)
  *H04W 48/08* (2009.01)
  *H04N 21/4367* (2011.01)
  *H04L 12/751* (2013.01)
  *H04W 12/00* (2009.01)
  *H04L 12/773* (2013.01)
  *G06Q 30/02* (2012.01)
  *H04W 80/00* (2009.01)
  *H04W 76/00* (2018.01)

(52) U.S. Cl.
  CPC .............. *H04L 43/08* (2013.01); *H04L 45/70* (2013.01); *H04L 67/141* (2013.01); *H04N 21/4367* (2013.01); *H04Q 11/0005* (2013.01); *H04W 48/08* (2013.01); *G06Q 30/0233* (2013.01); *H04L 29/0619* (2013.01); *H04L 45/02* (2013.01); *H04L 45/60* (2013.01); *H04W 12/003* (2019.01); *H04W 76/00* (2013.01); *H04W 80/00* (2013.01)

(58) Field of Classification Search
  CPC ......... H04L 41/28; H04L 43/08; H04L 45/70; H04W 40/28; H04W 40/30; H04W 72/1242; H04W 72/1247; H04W 48/08; H04W 76/00; H04W 80/00; H04N 21/4367
  See application file for complete search history.

(56) References Cited

U.S. PATENT DOCUMENTS

| | | | |
|---|---|---|---|
| 6,999,943 B1 | 2/2006 | Johnson et al. | |
| 7,502,760 B1 | 3/2009 | Gupta | |
| 7,676,431 B2 | 3/2010 | O'Leary et al. | |
| 7,849,010 B2 | 12/2010 | Deyoe et al. | |
| 8,069,121 B2 | 11/2011 | Goodrich et al. | |
| 8,352,360 B2 | 1/2013 | De Judicibus et al. | |
| 8,583,549 B1 | 11/2013 | Mohsenzadeh | |
| 8,738,529 B2 | 5/2014 | Kolhatkar et al. | |
| 8,779,921 B1 | 7/2014 | Curtiss | |
| 8,812,401 B2 | 8/2014 | Kendrick et al. | |
| 8,861,005 B2 | 10/2014 | Grosz | |
| 9,424,508 B2 | 8/2016 | Proud et al. | |
| 9,607,507 B1 | 3/2017 | McClintock et al. | |
| 9,646,209 B2 | 5/2017 | Kaps et al. | |
| 9,712,374 B1* | 7/2017 | Cao | H04L 29/08072 |
| 10,015,094 B1 | 7/2018 | Akers et al. | |
| 10,210,566 B1 | 2/2019 | Dorogusker et al. | |
| 10,445,715 B2 | 10/2019 | Granbery et al. | |
| 10,601,718 B2* | 3/2020 | Twombly | H04L 47/24 |
| 2002/0111886 A1 | 8/2002 | Chenevich et al. | |
| 2004/0127947 A1 | 7/2004 | Kim et al. | |
| 2005/0050223 A1 | 3/2005 | Roeder et al. | |
| 2005/0066052 A1 | 3/2005 | Gupta et al. | |
| 2005/0192895 A1 | 9/2005 | Rogers et al. | |
| 2005/0193002 A1 | 9/2005 | Souders et al. | |
| 2006/0067334 A1 | 3/2006 | Ougarov et al. | |
| 2006/0179472 A1* | 8/2006 | Chang | H04L 63/10 |
| | | | 726/2 |
| 2006/0206408 A1 | 9/2006 | Nassiri | |
| 2007/0140265 A1 | 6/2007 | Proust et al. | |
| 2007/0226129 A1 | 9/2007 | Liao et al. | |
| 2007/0299829 A1 | 12/2007 | Boinus et al. | |
| 2008/0034425 A1 | 2/2008 | Overcash et al. | |
| 2009/0018955 A1 | 1/2009 | Chen et al. | |
| 2009/0112662 A1 | 4/2009 | Mullen et al. | |
| 2009/0158290 A1 | 6/2009 | Halasz et al. | |
| 2010/0070405 A1 | 3/2010 | Joa et al. | |
| 2010/0125674 A1 | 5/2010 | Vasseur et al. | |
| 2010/0220622 A1 | 9/2010 | Wei | |
| 2010/0228627 A1 | 9/2010 | Hong et al. | |
| 2010/0280909 A1 | 11/2010 | Zhang et al. | |
| 2010/0332337 A1 | 12/2010 | Bullock | |
| 2011/0066949 A1 | 3/2011 | DeLuca et al. | |
| 2011/0153402 A1 | 6/2011 | Craig | |
| 2011/0153676 A1 | 6/2011 | Wu | |
| 2011/0249666 A1 | 10/2011 | Holbrook et al. | |
| 2012/0084205 A1 | 4/2012 | Dheer et al. | |
| 2012/0122514 A1* | 5/2012 | Cheng | H04W 48/18 |
| | | | 455/524 |
| 2012/0197786 A1 | 8/2012 | Brown | |
| 2012/0197787 A1 | 8/2012 | Grigg et al. | |
| 2012/0208549 A1 | 8/2012 | Lau et al. | |
| 2013/0080623 A1 | 3/2013 | Thireault | |
| 2013/0215733 A1 | 8/2013 | Jiang et al. | |
| 2013/0238455 A1 | 9/2013 | Laracey | |
| 2013/0335219 A1 | 12/2013 | Malkowski | |
| 2014/0006253 A1 | 1/2014 | Nuzzi et al. | |
| 2014/0012704 A1 | 1/2014 | Mizhen et al. | |
| 2014/0046844 A1 | 2/2014 | Grigg | |
| 2014/0122198 A1 | 5/2014 | Cheung et al. | |
| 2014/0123135 A1 | 5/2014 | Huang et al. | |
| 2014/0129357 A1 | 5/2014 | Goodwin | |
| 2014/0153465 A1 | 6/2014 | Yeh et al. | |
| 2014/0164584 A1 | 6/2014 | Joe et al. | |
| 2014/0207282 A1 | 7/2014 | Angle et al. | |
| 2014/0229388 A1 | 8/2014 | Pereira et al. | |
| 2014/0278965 A1 | 9/2014 | Douglas et al. | |
| 2015/0012425 A1 | 1/2015 | Mathew | |
| 2015/0036684 A1 | 2/2015 | Modi et al. | |
| 2015/0100491 A1 | 4/2015 | Fote | |
| 2015/0120909 A1 | 4/2015 | Karthikeyan | |
| 2015/0135337 A1 | 5/2015 | Fushman et al. | |
| 2015/0161645 A1 | 6/2015 | Unser et al. | |
| 2015/0169705 A1 | 6/2015 | Korbecki et al. | |
| 2015/0193781 A1 | 7/2015 | Dave et al. | |
| 2015/0235220 A1 | 8/2015 | Murphy, Jr. et al. | |
| 2015/0261974 A1 | 9/2015 | Kirigin et al. | |
| 2015/0348042 A1 | 12/2015 | Jivraj et al. | |
| 2016/0021084 A1 | 1/2016 | Eisen | |
| 2016/0086174 A1 | 3/2016 | Koraichi et al. | |
| 2016/0105406 A1 | 4/2016 | Smith et al. | |
| 2016/0140355 A1 | 5/2016 | Jagota et al. | |
| 2016/0232600 A1 | 8/2016 | Purves | |
| 2016/0239840 A1 | 8/2016 | Preibisch | |
| 2016/0261616 A1 | 9/2016 | Shulman et al. | |
| 2016/0301731 A1 | 10/2016 | Loeb et al. | |
| 2016/0361009 A1 | 12/2016 | Proud et al. | |
| 2017/0004487 A1 | 1/2017 | Hagen et al. | |

(56) References Cited

U.S. PATENT DOCUMENTS

| | | |
|---|---|---|
| 2017/0004573 A1 | 1/2017 | Hussain |
| 2017/0031963 A1 | 2/2017 | Merz et al. |
| 2017/0070484 A1 | 3/2017 | Kruse et al. |
| 2017/0083877 A1 | 3/2017 | Dix |
| 2017/0083985 A1 | 3/2017 | Lacoss-Arnold et al. |
| 2017/0091385 A1 | 3/2017 | Knoplioch et al. |
| 2017/0124548 A1 | 5/2017 | Bolla |
| 2017/0188059 A1 | 6/2017 | Major |
| 2017/0236189 A1 | 8/2017 | Srinath |
| 2017/0339009 A1 | 11/2017 | O'Brien et al. |
| 2017/0359415 A1 | 12/2017 | Venkatraman et al. |
| 2018/0005217 A1 | 1/2018 | Granbery et al. |
| 2018/0018195 A1 | 1/2018 | Kim et al. |
| 2018/0018660 A1 | 1/2018 | Gomes et al. |
| 2018/0025341 A1 | 1/2018 | Chandra et al. |
| 2018/0039989 A1 | 2/2018 | Beye et al. |
| 2018/0165759 A1 | 6/2018 | Carrington et al. |
| 2018/0181951 A1 | 6/2018 | Goldfinger et al. |
| 2018/0268408 A1 | 9/2018 | Botros et al. |
| 2019/0005484 A1 | 1/2019 | Mohsenzadeh |
| 2019/0081898 A1 | 3/2019 | King et al. |

OTHER PUBLICATIONS

Sep. 25, 2018—U.S. Office Action—U.S. Appl. No. 15/477,805.
Oct. 5, 2018—U.S. Office Action—U.S. Appl. No. 15/477,803.
Dec. 13, 2018—U.S. Office Action—U.S. Appl. No. 15/477,806.
Mar. 19, 2019—U.S. Final Office Action—U.S. Appl. No. 15/477,803.
Nov. 13, 2019—U.S. Notice of Allowance—U.S. Appl. No. 15/477,826.
Jan. 28, 2020—U.S. Notice of Allowance—U.S. Appl. No. 15/477,817.
Jul. 25, 2019—U.S. Final Office Action—U.S. Appl. No. 15/477,817.
Oct. 23, 2019—U.S. Notice of Allowance—U.S. Appl. No. 15/477,806.
Oct. 29, 2019—U.S. Non-Final Office Action—U.S. Appl. No. 15/477,803.
Oct. 31, 2019—U.S. Non-Final Office Action—U.S. Appl. No. 15/477,822.
Oct. 31, 2019—U.S. Non-Final Office Action—U.S. Appl. No. 15/477,834.
Feb. 5, 2020—U.S. Notice of Allowance—U.S. Appl. No. 15/477,806.
"Payment Services Directive: Commission Encourages Swift and Coherent Implementation at National Level;" European Commission—Press Release—Dated Dec. 12, 2007—http://europa.eu/rapid/press-release_IP-07-1914_en.htm?locate=en.
Phillips, Lisa; "EWS Can Stop You From Opening a Bank Account;" Dated Apr. 9, 2015; http://rebuildcreditscores.com/early-warning-services/.
"Mint: Money Manager, Bill Pay, Credit Score, Budgeting, & Investing;" Dated Jan. 31, 2017, https://www.mint.com/.
Deane-Johns, Simon, and Susan McLean; "FinTech Focus: New European Directive on Payment Services (PSD2) Comes Into Force;" Morrison Foerster; Dated Feb. 1, 2016.
PayPal; "One Touch FAQ"—Dated Jan. 31, 2017; https://www.paypal.com/us/webapps/mpp/one-touch-checkout/faq.
"PSD2—The Directive That Will Change Banking As We Know It;" Dated Jan. 31, 2017; https://www.evry.com/en/news/articles/psd2-the-directive-that-will-change-banking-as-we-know-it/.
Official Journal of the European Union; "Directives;" L337/35-127; Dated Dec. 23, 2015.
"UK Sets Out Open Banking API Framework;" Finextra; Dated Feb. 9, 2016; https://www.finextra.com/news/fullstory.aspx?newsitemid=28439.
Oct. 29, 2018—U.S. Office Action—U.S. Appl. No. 15/477,830.
Anmar Aldubaikhi et al. "Optimal Routing: A Critical Review" MPRA Munich Personal RePEc Archive, https://mpra.ub.uni-muenchen.de/67065/, Nov. 2013, pp. 1-21.
Clemens Rosenbaum et al. "Routing Networks: Adaptive Selection of Non-Linear Functions for Multi-Task Learning" Published as a conference paper at ICLR 2018, pp. 1-16.
"Routings" Oracle Bills of Material User's Guide Release 12.2, https://docs.oracle.com/cd/E26401_01/doc.122/e48956/T272930T275775.htm Dec. 9, 2018, pp. 1-17.
Allen Kim "Internet-centric solution is more than moving online—Lexology" http://www.lexology.com/library/detail.aspx?g+a9efa214-e8d7-4ab6-b5bf-e33444d3b1e8 Jul. 17, 2017, pp. 1-2.
"Real Time" Microsoft Computer Dictionary, 2002 Microsoft Corp, pp. 1-3.
Jun. 19, 2019—U.S. Notice of Allowance—U.S. Appl. No. 15/477,806.
Jul. 25, 2019—U.S. Notice of Allowance—U.S. Appl. No. 15/477,805.
Jul. 9, 2019—U.S. Final Office Action—U.S. Appl. No. 15/477,822.
Jul. 7, 2019—U.S. Final Office Action—U.S. Appl. No. 15/477,834.
Jul. 31, 2019—U.S. Notice of Allowance—U.S. Appl. No. 15/477,830.
Apr. 15, 2020—U.S. Final Office Action—U.S. Appl. No. 15/477,822.
Apr. 20, 2020—U.S. Final Office Action—U.S. Appl. No. 15/477,834.

* cited by examiner

DATA TRANSFER, OVER SESSION OR CONNECTION, AND BETWEEN COMPUTING DEVICE AND SERVER ASSOCIATED WITH A ROUTING NETWORK FOR MODIFYING ONE OR MORE PARAMETERS OF THE ROUTING NETWORK

CROSS REFERENCE TO RELATED APPLICATION

This patent application is a continuation of U.S. patent application Ser. No. 15/477,830 filed Apr. 3, 2017 entitled "Data Transfer, Over Session or Connection, and Between Computing Device and Server Associated with a Routing Network for Modifying One or More Parameters of the Routing Network". This application claims priority to and the benefit of the above-identified application which is fully incorporated by reference herein in its entirety.

TECHNICAL FIELD

One or more aspects of the disclosure generally relate to computing devices, computing systems, and computer software. In particular, one or more aspects of the disclosure generally relate to computing devices, computing systems, and computer software that may be used to determine one or more routing networks based on location and/or an identification of an item, process and aggregate data from a plurality of data sources and perform one or more actions based on the processed and aggregated data, and/or generate recommendations for and transmitting data to a third party.

BACKGROUND

Data may be generated by numerous data sources, such as user data sources, routing network data sources, and the like. Determining an appropriate routing network to use for activities associated with the generated data may be difficult without a proper system for aggregating data and recommending routing networks. What is needed is a more efficient system for receiving and aggregating data from a plurality of data sources and/or a more efficient system for selecting optimized routing networks for use with activities.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

A method, apparatus, computer-readable medium, and/or system may comprise a wireless sensing device configured to detect that a user device is within range of a location. In response to detecting that the user device is within range of the location, the wireless sensing device may transmit, to a computing device, data indicating that the user device is within range of the location. The computing device may comprise a processor and memory storing computer-executable instructions that, when executed by the processor, cause the computing device to generate, for display via the user device, a notification indicating the one or more routing networks for the user device to use at the location. After the user device is within range of the location, the computing device may generate a secure session connection between the computing device and the user device. The computing device may transmit, to the user device and via the secure session connection, the notification indicating the one or more routing networks for the user device to use at the location. The user device may be configured to receive, from the computing device and via the secure session connection, the notification indicating the one or more routing networks for the user device to use at the location. The user device may display the notification indicating the one or more routing networks.

In some aspects, detecting that the user device is within range of the location may comprise detecting a communication between the user device and the wireless sensing device. The wireless sensing device may comprise one or more of a Bluetooth beacon, a wireless access point, or a near field communication sensor.

In some aspects, the memory may store computer-executable instructions that, when executed by the processor, cause the computing device to, in response to receiving the data indicating that the user device is within range of the location, associate the one or more routing networks with the user device. The computing device may determine, based on the wireless sensing device, that the user device is not within range of the location. The computing device, in response to determining that the user device is not within range of the location, may disassociate the one or more routing networks from the user device.

In some aspects, the memory may store computer-executable instructions that, when executed by the processor, cause the computing device to receive, from the user device, a request to use a first routing network of the one or more routing networks. In response to receiving the request to use the first routing network, the computing device may transmit, to a server associated with the first routing network, data indicating the request to use the first routing network.

In some aspects, the memory may store computer-executable instructions that, when executed by the processor, cause the computing device to receive, from the user device, a request to use at least one of the one or more routing networks. In response to receiving the request to use the at least one of the one or more routing networks, the computing device may determine whether the request indicates a selection of a routing network of the one or more routing networks. In response to determining that the request does not indicate a selection of a routing network, the computing device may determine, based on the location, a first routing network of the one or more routing networks. In response to determining the first routing network, the computing device may transmit, to a server associated with the first routing network, data indicating the request to use the at least one of the one or more routing networks.

A method, apparatus, computer-readable medium, and/or system may comprise a computing device comprising a processor and memory storing computer-executable instructions that, when executed by the processor, cause the computing device to receive, from a user device, data indicative of an item. The computing device may be located at a first location, and the user device may be located at a second location, where the first location is different from the second location. The computing device may identify the item based on item recognition using the data indicative of the item. The computing device may determine, based on the identified item, one or more routing networks for the user device to use for the identified item. The computing device may generate, for display via the user device, a notification indicating the one or more routing networks for the user device to use for the identified item. The computing device may transmit, to the user device, and via a secure session connection, the notification indicating the one or more routing networks for the user device to use for the identified item. The user device may be configured to receive, from the computing device, the notification indicating the one or more routing networks for the user device to use for the identified item. The user device may display the notification indicating the one or more routing networks.

In some aspects, the user device may comprise a camera. The data indicative of the item may comprise an image captured by the camera of the user device. The item recognition using the data indicative of the item may comprise image recognition of the image captured by the camera of the user device.

In some aspects, the data indicative of the item may comprise code information associated with the item and captured by the camera of the user device. The item recognition using the data indicative of the item may comprise item recognition using the code information associated with the item and captured by the camera of the user device. The code information may comprise one or more of barcode information or quick response (QR) code information.

In some aspects, the system may comprise a wireless sensing device configured to detect that the user device is within range of the second location. Determining the one or more routing networks for the user device to use for the identified item may further be based on the second location.

In some aspects, the memory may store computer-executable instructions that, when executed by the processor, cause the computing device to receive, from the user device, a request to use a first routing network of the one or more routing networks. In response to receiving the request to use the first routing network, the computing device may transmit, to a server associated with the first routing network, data indicating the request to use the first routing network.

In some aspects, the memory may store computer-executable instructions that, when executed by the processor, cause the computing device to receive, from the user device, a request to use at least one of the one or more routing networks. In response to receiving the request to use the at least one of the one or more routing networks, the computing device may determine whether the request indicates a selection of a routing network of the one or more routing networks. In response to determining that the request does not indicate a selection of a routing network, the computing device may determine, based on the identified item, a first routing network of the one or more routing networks. In response to determining the first routing network, the computing device may transmit, to a server associated with the first routing network, data indicating the request to use the at least one of the one or more routing networks.

A method, apparatus, computer-readable medium, and/or system may comprise a computing device comprising a processor and memory storing computer-executable instructions that, when executed by the processor, cause the computing device to generate a secure session connection between the computing device and a server associated with one or more routing networks. The computing device may receive, from the server and via the secure session connection, data associated with the one or more routing networks. The computing device may store, at a database, the data associated with the one or more routing networks. The computing device may determine whether new activity associated with a user and involving at least one of the one or more routing networks is detected. In response to determining that new activity associated with the user is detected, the computing device may transmit, to the database, a request for the stored data associated with the one or more routing networks. The computing device may receive, from the database, the stored data associated with the one or more routing networks. The computing device may determine, based on a plurality of factors determined from the stored data associated with the one or more routing networks, a score for the new activity. The server associated with one or more routing networks may be configured to transmit, to the computing device and via the secure session connection, the data associated with the one or more routing networks.

In some aspects, determining that the new activity associated with the user is detected may comprise receiving, from a user device associated with the user or from a second computing device, a request to use at least one of the one or more routing networks.

In some aspects, the memory may store computer-executable instructions that, when executed by the processor, cause the computing device to determine a location of the new activity. Determining the score for the new activity may be based at least in part on a comparison of the location of the new activity to one or more locations indicated by the stored data associated with the one or more routing networks. Determining the location of the new activity may comprise detecting, based on a wireless sensing device, that a device associated with the new activity is within range of the location. In response to detecting that the device associated with the new activity is within range of the location, the wireless sensing device may transmit, to the computing device, data indicating the location of the new activity.

In some aspects, the memory may store computer-executable instructions that, when executed by the processor, cause the computing device to determine whether the score for the new activity exceeds a threshold. In response to determining that the score for the new activity exceeds the threshold, the computing device may terminate the new activity.

In some aspects, the memory may store computer-executable instructions that, when executed by the processor, cause the computing device to determine whether the score for the new activity exceeds a threshold. In response to determining that the score for the new activity exceeds the threshold, the computing device may transmit, to a user device associated with the one or more routing networks, an alert message indicating that the new activity exceeds the threshold.

In some aspects, the memory may store computer-executable instructions that, when executed by the processor, cause the computing device to determine whether the score for the new activity exceeds a threshold. In response to determining that the score for the new activity exceeds the threshold, the computing device may transmit, to a computing device at a location where the new activity was initiated, an alert message indicating that the new activity exceeds the threshold.

A method, apparatus, computer-readable medium, and/or system may comprise a computing device comprising a processor and memory storing computer-executable instructions that, when executed by the processor, cause the computing device to generate a first secure session connection between the computing device and a first server associated with a first routing network. The computing device may receive, from the first server and via the first secure session connection, data associated with the first routing network. The computing device may generate a second secure session connection between the computing device and a second server associated with a second routing network. The computing device may receive, from the second server and via the second secure session connection, data associated with the second routing network. The computing device may analyze the data associated with the first routing network and the data associated with the second routing network. The computing device may determine, based on the analyzing the data associated with the first routing network and the data associated with the second routing network, a likelihood of a user device using a new routing network different from the first routing network and the second routing network. In response to determining that the likelihood of the user device using the new routing network exceeds a threshold, the computing device may generate, for display via the user device, a notification indicating a recommendation for the new routing network. The computing device may transmit, to the user device, the notification indicating the recommendation for the new routing network. The user device may be configured to display the notification indicating the recommendation for the new routing network. The first server associated with the first routing network may be configured to transmit, to the computing device and via the first secure session connection, the data associated with the first routing network. The second server associated with the second routing network may be configured to transmit, to the computing device and via the second secure session connection, the data associated with the second routing network.

In some aspects, the new routing network may be associated with the first server or the second server. Additionally or alternatively, the new routing network may be associated with a third server different from the first server and the second server. The memory may store computer-executable instructions that, when executed by the processor, cause the computing device to generate a third secure session connection between the computing device and the third server associated with the new routing network.

In some aspects, the determining the likelihood of the user device using the new routing network may be based on an additional factor different from factors identified from the analyzing the data associated with the first routing network and the data associated with the second routing network.

In some aspects, the memory may store computer-executable instructions that, when executed by the processor, cause the computing device to categorize the data associated with the first routing network and the data associated with the second routing network. The computing device may generate, based on the categorizing, a plurality of tags for the data associated with the first routing network and the data associated with the second routing network. The analyzing the data associated with the first routing network and the data associated with the second routing network may be based on the plurality of tags. The computing device may store, at a storage device and with one or more tag of the plurality of tags, the data associated with the first routing network and the data associated with the second routing network.

In some aspects, the memory may store computer-executable instructions that, when executed by the processor, cause the computing device to, prior to the analyzing, receive, from the user device, a request to access the new routing network. The determining the likelihood of the user device using the new routing network may be performed in response to the receiving the request to access the new routing network.

A method, apparatus, computer-readable medium, and/or system may comprise a computing device comprising a processor and memory storing computer-executable instructions that, when executed by the processor, cause the computing device to generate a secure session connection between the computing device and a server associated with a plurality of routing networks. The computing device may receive, from the server and via the secure session connection, data associated with the plurality of routing networks. The computing device may determine whether activity associated with a user and involving at least one of the plurality of routing networks is detected. In response to determining that the activity associated with the user is detected, the computing device may determine, based on the data associated with the plurality of routing networks, a score for the activity. The computing device may determine a third party routing network different from each routing network of the plurality of routing networks. The computing device may generate, for display via a second computing device, a recommendation to use one or more routing network of the plurality of routing networks and the third party routing network. The computing device may transmit, to the second computing device, the recommendation to use the one or more routing network of the plurality of routing networks and the third party routing network. The second computing device may be configured to receive, from the computing device, the recommendation to use the one or more routing network of the plurality of routing networks and the third party routing network. The second computing device may display the recommendation to use the one or more routing network of the plurality of routing networks and the third party routing network.

In some aspects, the detected activity may be initiated at a location of the second computing device. The memory may store computer-executable instructions that, when executed by the processor, cause the computing device to determine whether the score for the activity is less than a threshold score. The determining the third party routing network may be performed in response to determining that the score for the activity is less than the threshold score.

In some aspects, the memory may store computer-executable instructions that, when executed by the processor, cause the computing device to determine whether the score for the activity is less than a threshold score. Generating the recommendation to use the one or more routing network of the plurality of routing networks and the third party routing network may be performed in response to determining that the score for the activity is less than the threshold score.

In some aspects, the memory may store computer-executable instructions that, when executed by the processor, cause the computing device to, prior to transmitting the recommendation to the second computing device, generate a secure session connection between the computing device and the second computing device.

In some aspects, the memory may store computer-executable instructions that, when executed by the processor, cause the computing device to receive, from the second computing device, a selection of the third party routing network to use for the activity. In response to receiving the selection of the third party routing network to use for the activity, the computing device may transmit, to a server associated with the third party routing network, data indicating the selection of the third party routing network to use for the activity.

In some aspects, the memory may store computer-executable instructions that, when executed by the processor, cause the computing device to receive, from the second computing device, a selection of a first routing network of the one or more routing network to use for the activity. In response to receiving the selection of the first routing network to use for the activity, the computing device may transmit, to the server associated with the plurality of routing networks, data indicating the selection of the first routing network to use for the activity.

A method, apparatus, computer-readable medium, and/or system may comprise a computing device comprising a processor and memory storing computer-executable instructions that, when executed by the processor, cause the computing device to generate a secure session connection between a computing device and a server associated with a plurality of routing networks. The computing device may receive, from the server and via the secure session connection, data associated with the plurality of routing networks. The computing device may determine whether a request to use a routing network of the plurality of routing networks at a location of a second computing device has been received. In response to determining that the request to use the routing network has been received, the computing device may determine, based on the data associated with the plurality of routing networks, a score for the request to use the routing network. The computing device may determine a third party routing network different from the routing network of the plurality of routing networks. The computing device may generate, for display via a second computing device at the location, a list comprising one or more routing network of the plurality of routing networks and the third party routing network. The computing device may transmit, to the second computing device, the list comprising the one or more routing network of the plurality of routing networks and the third party routing network. The second computing device may be configured to receive, from the computing device, the list comprising the one or more routing network of the plurality of routing networks and the third party routing network. The second computing device may display the list comprising the one or more routing network of the plurality of routing networks and the third party routing network.

In some aspects, the memory may store computer-executable instructions that, when executed by the processor, cause the computing device to determine whether a number of the one or more routing network of the plurality of routing networks exceeds a threshold number. Determining the third party routing network may be performed in response to determining that the number of the one or more routing network of the plurality of routing networks does not exceed the threshold number.

In some aspects, the memory may store computer-executable instructions that, when executed by the processor, cause the computing device to determine whether a number of the one or more routing network of the plurality of routing networks exceeds a threshold number. Generating the list comprising the one or more routing network of the plurality of routing networks and the third party routing network may be performed in response to determining that the number of the one or more routing network of the plurality of routing networks does not exceed the threshold number.

In some aspects, the memory may store computer-executable instructions that, when executed by the processor, cause the computing device to prior to transmitting the list to the second computing device, generate a secure session connection between the computing device and the second computing device.

In some aspects, the memory may store computer-executable instructions that, when executed by the processor, cause the computing device to store, at a database, the data associated with the plurality of routing networks. The determining the score for the request to use the routing network may be performed based on the stored data associated with the plurality of routing networks.

In some aspects, the memory may store computer-executable instructions that, when executed by the processor, cause the computing device to transmit, to the second computing device, the score for the request to use the routing network.

A method, apparatus, computer-readable medium, and/or system may comprise a computing device comprising a processor and memory storing computer-executable instructions that, when executed by the processor, cause the computing device to generate a first secure session connection between a computing device and a first server associated with a first routing network. The computing device may receive, from the first server and via the first secure session connection, a plurality of pieces of data associated with the first routing network. The computing device may generate a second secure session connection between the computing device and a second server associated with a second routing network. The computing device may receive, from the second server and via the second secure session connection, a plurality of pieces of data associated with the second routing network. The computing device may categorize each of the plurality of pieces of data associated with the first routing network and the plurality of pieces of data associated with the second routing network. The computing device may generate, based on the categorizing, one or more tags for each of the plurality of pieces of data associated with the first routing network and the plurality of pieces of data associated with the second routing network. The computing device may generate, based on the one or more tags, a plurality of blocks of data. Each block of data of the plurality of blocks of data may comprise at least a portion of the plurality of pieces of data associated with the first routing network and the plurality of pieces of data associated with the second routing network. The computing device may store, at a storage device and with one or more corresponding tags, the plurality of blocks of data. The computing device may receive a request to share data with a third party computing device. In response to receiving the request to share data with the third party computing device, the computing device may transmit, to the third party computing device and based on the one or more corresponding tags, a block of data of the plurality of blocks of data. The first server associated with the first routing network may be configured to transmit, to the computing device and via the first secure session connection, the plurality of pieces of data associated with the first routing network. The second server associated with the second routing network may be configured to transmit, to the computing device and via the second secure session connection, the plurality of pieces of data associated with the second routing network.

In some aspects, receiving the request to share data may comprise receiving, from a user device or from the third party computing device, the request to share data. The memory may store computer-executable instructions that, when executed by the processor, cause the computing device to, prior to transmitting the block of data, determine whether the computing device has permission to share the block of data with the third party computing device. Transmitting the block of data may be performed in response to determining that the computing device has permission to share the block of data with the third party computing device.

In some aspects, the memory may store computer-executable instructions that, when executed by the processor, cause the computing device to, prior to transmitting the block of data, determine whether the computing device has permission to share the block of data with the third party computing device. In response to determining that the computing device does not have permission to share the block of data with the third party computing device, the computing device may generate, for display via a user device, a notification requesting permission for the computing device to share the block of data with the third party computing device. The computing device may receive, from the user device, permission for the computing device to share the block of data with the third party computing device. The transmitting the block of data may be performed in response to receiving the permission for the computing device to share the block of data with the third party computing device.

In some aspects, the memory may store computer-executable instructions that, when executed by the processor, cause the computing device to generate a recommendation for a second block of data of the plurality of blocks of data to share with the third party computing device. The computing device may transmit, to the third party computing device, the second block of data. Generating the recommendation for the second block of data of the plurality of blocks of data to share with the third party computing device may be based on one or more of the block of data or the third party computing device.

In some aspects, the memory may store computer-executable instructions that, when executed by the processor, cause the computing device to generate a third secure session connection between the computing device and a user device. The computing device may receive, from the user device and via the third secure session connection, a plurality of pieces of user data associated with the user device. The computing device may update one or more of the plurality of blocks of data with at least a portion of the plurality of pieces of user data associated with the user device.

A method, apparatus, computer-readable medium, and/or system may comprise a user device configured to transmit, to a computing device, data indicative of a first routing network and data indicative of a second routing network. The computing device may comprise a processor and memory storing computer-executable instructions that, when executed by the processor, cause the computing device to receive, from the user device, the data indicative of the first routing network and the data indicative of the second routing network. The computing device may determine, based on the data indicative of the first routing network, a plurality of parameters for the first routing network. The computing device may determine, based on the data indicative of the second routing network, a plurality of parameters for the second routing network. The computing device may generate a secure session connection between the computing device and a server associated with the second routing network. The computing device may receive, from the server and via the secure session connection between the computing device and the server associated with the second routing network, a modification to one or more parameters of the plurality of parameters for the second routing network. The computing device may determine priorities for the first routing network and the second routing network based at least in part on the plurality of parameters for the first routing network and the modification to the one or more parameters of the plurality of parameters for the second routing network. The computing device may store, at a database, the priorities for the first routing network and the second routing network.

In some aspects, the memory may store computer-executable instructions that, when executed by the processor, cause the computing device to, prior to receiving the data indicative of the plurality of routing networks, generate a secure session connection between the computing device and the user device. Receiving the data indicative of the plurality of routing networks may comprise receiving the data indicative of the plurality of routing networks via the secure session connection.

In some aspects, the memory may store computer-executable instructions that, when executed by the processor, cause the computing device to generate a secure session connection between the computing device and a server associated with the first routing network. The computing device may receive, from the server associated with the first routing network, and via the secure session connection between the computing device and the server associated with the first routing network, a modification to one or more parameters of the plurality of parameters for the first routing network. Determining the priorities for the first routing network and the second routing network may comprise determining the priorities for the first routing network and the second routing network based at least in part on the modification to the one or more parameters of the plurality of parameters for the first routing network and the modification to the one or more parameters of the plurality of parameters for the second routing network.

In some aspects, the memory may store computer-executable instructions that, when executed by the processor, cause the computing device to determine a data translation for one or more of the plurality of parameters for the first routing network and the plurality of parameters for the second routing network. The determining the priorities for the first routing network and the second routing network may be based on the data translation.

In some aspects, the data indicative of the first routing network and the data indicative of a second routing network may comprise user input data indicative of the first routing network and user input data indicative of the second routing network received at the user device and from a user.

In some aspects, the memory may store computer-executable instructions that, when executed by the processor, cause the computing device to receiving, by the computing device and from the user device, a request to use the first routing network. In response to receiving the request to use the first routing network, the computing device may transmit, to a server associated with the first routing network, data indicating the request to use the first routing network.

In some aspects, the system may further comprise the server associated with the second routing network. The server may be configured to transmit, to the computing device and via the secure session connection between the computing device and the server associated with the second routing network, the modification to the one or more parameters of the plurality of parameters for the second routing network.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

Figure 1:
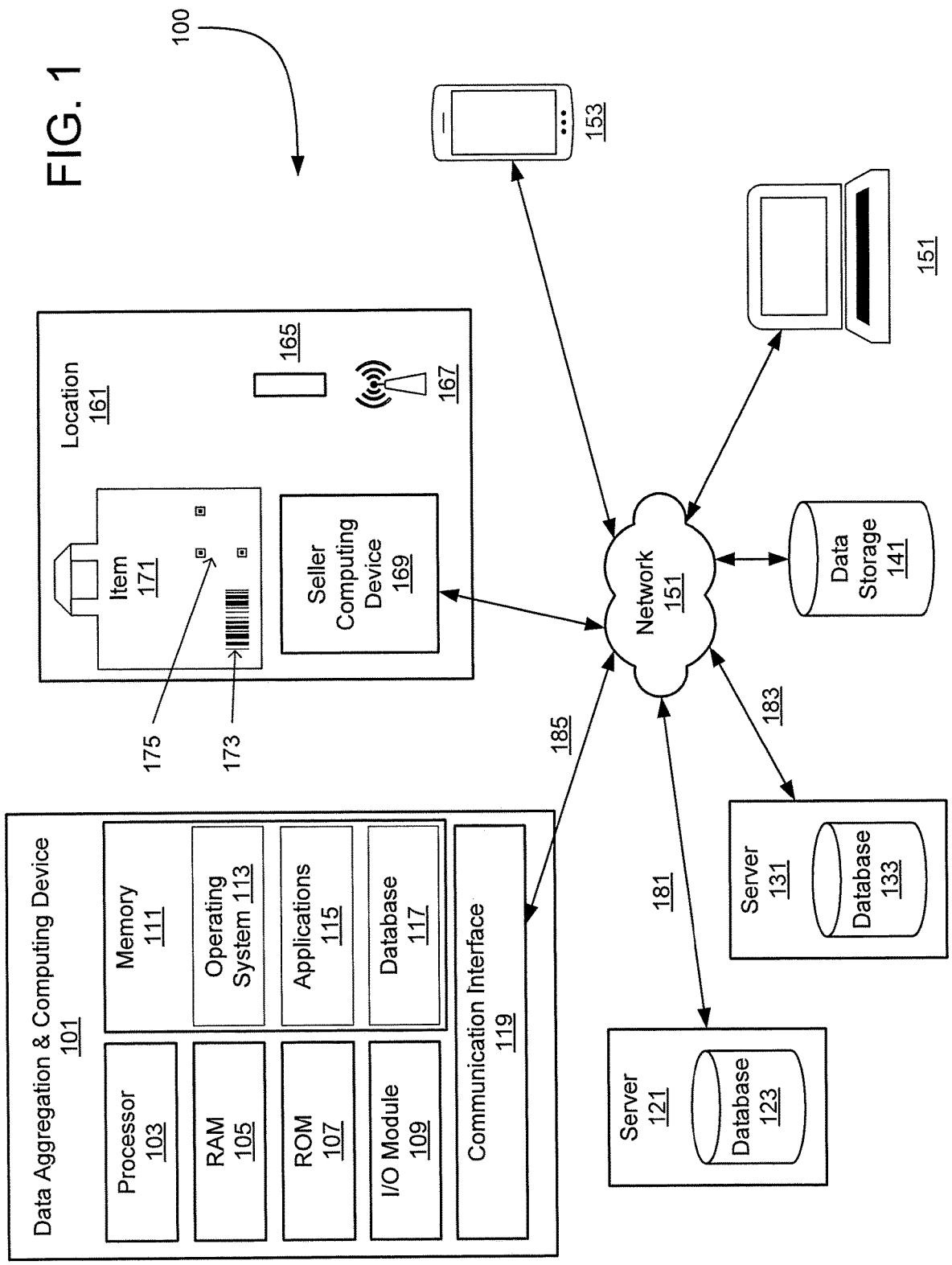
FIG. 1 illustrates an example operating environment in which various aspects of the disclosure may be implemented.

FIG. 1 illustrates an example operating environment in which various aspects of the disclosure may be implemented. An illustrative system 100 for implementing methods according to the present disclosure is shown. System 100 may include a data aggregation and computing device 101. As will be described in further detail below, the computing device 101 may facilitate determining one or more routing networks (e.g., data routing networks) based on location and/or an identification of an item, processing and aggregating data from a plurality of data sources and performing one or more actions based on the processed and aggregated data, and/or generating recommendations for and transmitting data to a third party.

The computing device 101 may have a processor 103 for controlling overall operation of the computing device and its associated components, including for example random access memory (RAM) 105, read-only memory (ROM) 107, input/output (I/O) module 109, and memory 111. I/O module 109 may include, e.g., a microphone, mouse, keypad, touch screen, scanner, optical reader, and/or stylus (or other input device(s)) through which a user of computing device 101 may provide input, and may also include one or more of a speaker for providing audio output and a video display device for providing textual, audiovisual, and/or graphical output. Software may be stored within memory 111 and/or other storage to provide instructions to processor 103 for enabling computing device 101 to perform various functions. For example, memory 111 may store software used by the computing device 101, such as an operating system 113, application programs 115, and an associated database 117. Additionally or alternatively, some or all of the computer executable instructions for computing device 101 may be embodied in hardware or firmware (not shown).

The computing device 101 may operate in a networked environment supporting connections to one or more other computers, such as server 121 and server 131 (or other devices). The servers 121 and 131 may be servers that include any or all of the elements described above with respect to the computing device 101. The network connections depicted in FIG. 1 include a local area network (LAN), and a wide area network (WAN), but may also include other networks. The computing device 101 may communicate with other computing devices using a communication interface 119 or other network interface for establishing communications over a LAN and/or a WAN, such as the Internet. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

In some aspects, the computing device 101 may comprise an application-based system for connecting a seller computing device 169, a first server 121, a second server 131, a user device 153, or any other devices.

System 100 may also include one or more servers 121 and 131 (and other servers, which are not illustrated), which may be any suitable server, processor, computer, or data processing device, or combination of the same. Servers 121 and/or 131 may each be owned, managed, and/or operated by a particular entity. In some aspects, each server 121 or 131 may be associated with one or more routing networks, such as financial routing networks and their associated accounts. Servers 121 and/or 131 may be connected by one or more communications links 181, and 183 to network 151. As will be described in further detail in the examples below, servers 121 and 131 may store data in its respective database 123 or 133 and may communicate, via a communication session, the data to other devices, such as the data aggregation and computing device 101, seller computing device 169, user devices 151 (e.g., laptop) and 153 (e.g., mobile phone), and/or or other devices. Servers 121 and 131 may store, e.g., via the database 123 and 133, transaction information (e.g., time, date, type of transaction), user information (e.g., username, account number, PIN, other unique identifiers), and various other information. Any of the elements in FIG. 1 may be implemented as one or more computing device, such as the example computing device 201 described in connection with FIG. 2 below.

Network 151 may be any suitable network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), a cellular network, or any combination of any of the same. Communications links 181, 183, 185, or other communication links may be any communications links suitable for communicating among the data aggregation and computing device 101, seller computing device 169, servers 121 and 131, user devices 151 and 153, and/or external data storage 141, such as network links, dial-up links, wireless links, hard-wired links, or other communications links.

A location 161 may comprise a seller's location, such as a retail store or any other type of seller's location. The location 161 may include one or more seller computing devices 169, such as point-of-sale computing devices or other devices usable to facilitate transactions at the location 161. The seller computing device 169 may include one or more of the components of the example computing device 201 described in connection with FIG. 2 below. The location 161 may include a plurality of items 171, such as products or services for sale at the location 161. Each item 171 may include one or more indications to identify the item 171, such as a barcode 173 and/or a quick-response (QR) code 175. The location 161 may also include one or more wireless sensing devices 165 (e.g., a wireless beacon, such as a Bluetooth beacon) or 167 (e.g., a wireless access point or near field communication (NFC) sensor). The wireless sensing devices 165 or 167 may be used to detect the presence of a user, such as by communicating with a user device 151 or 153, or any other user device within range of the wireless sensing devices.

The user devices 151 and/or 153 may comprise mobile devices (e.g., mobile phones, smartphones, PDAs, notebooks, tablets, other mobile devices) including various other components, such as a battery, speaker, and antennas. In some aspects, the user device 153 may include an interface for communicating with wireless sensing devices 165, such as a Bluetooth radio, a Wi-Fi radio, and/or an NFC reader. As will be described in further detail below, the presence of the user may be detected based on communications between the user device 153 and one or more of the wireless sensing devices 165. The user device 153 may include a camera for capturing images of, for example, the item 171, the barcode 173, the QR code 175, or any other identifier for the item 171. The user device 153 may include input devices for receiving user input, such as a touchscreen display, a physical keyboard, a microphone, and the like. As will be described in further detail below, the user may input a search string for an item, provide authentication credentials, select routing networks, and the like via the input devices of the user device 153.

Figure 2:
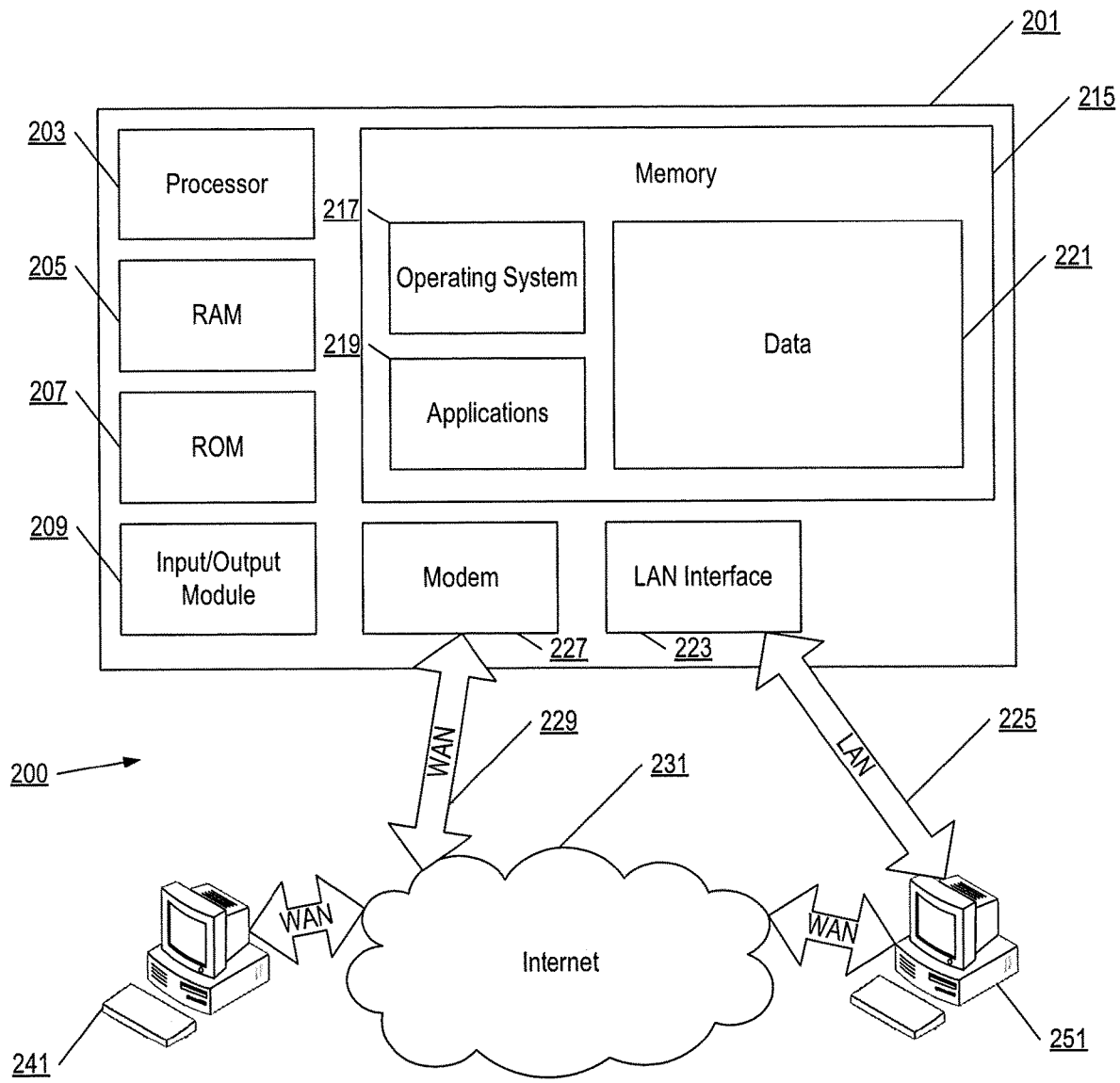
FIG. 2 illustrates another example operating environment in which various aspects of the disclosure may be implemented.

FIG. 2 illustrates an example block diagram of a computing device 201 (e.g., a computer server, desktop computer, laptop computer, tablet computer, other computing devices) in an example computing environment 200 that may be used according to one or more illustrative embodiments of the disclosure. The computing device 201 may have a processor 203 for controlling overall operation of the server and its associated components, including for example random access memory (RAM) 205, read-only memory (ROM) 207, input/output (I/O) module 209, and memory 215.

I/O module 209 may include, e.g., a microphone, mouse, keypad, touch screen, scanner, optical reader, and/or stylus (or other input device(s)) through which a user of computing device 201 may provide input, and may also include one or more of a speaker for providing audio output and a video display device for providing textual, audiovisual, and/or graphical output. Software may be stored within memory 215 and/or other storage to provide instructions to processor 203 for enabling computing device 201 to perform various functions. For example, memory 215 may store software used by the computing device 201, such as an operating system 217, application programs 219, and an associated database 221. Additionally or alternatively, some or all of the computer executable instructions for computing device 201 may be embodied in hardware or firmware (not shown).

The computing device 201 may operate in a networked environment supporting connections to one or more remote computers, such as terminals 241 and 251. The terminals 241 and 251 may be personal computers or servers that include any or all of the elements described above with respect to the computing device 201. The network connections depicted in FIG. 2 include a local area network (LAN) 225 and a wide area network (WAN) 229, but may also include other networks. When used in a LAN networking environment, the computing device 201 may be connected to the LAN 225 through a network interface or adapter 223. When used in a WAN networking environment, the computing device 201 may include a modem 227 or other network interface for establishing communications over the WAN 229, such as the Internet 231. It will be appreciated that the network connections shown are illustrative and other means of establishing a communications link between the computers may be used. The existence of any of various well-known protocols such as TCP/IP, Ethernet, FTP, HTTP, HTTPS, and the like is presumed. Computing device 201 and/or terminals 241 or 251 may also be mobile devices (e.g., mobile phones, smartphones, PDAs, notebooks, tablets, other mobile devices) including various other components, such as a battery, speaker, and antennas.

Figure 3A:
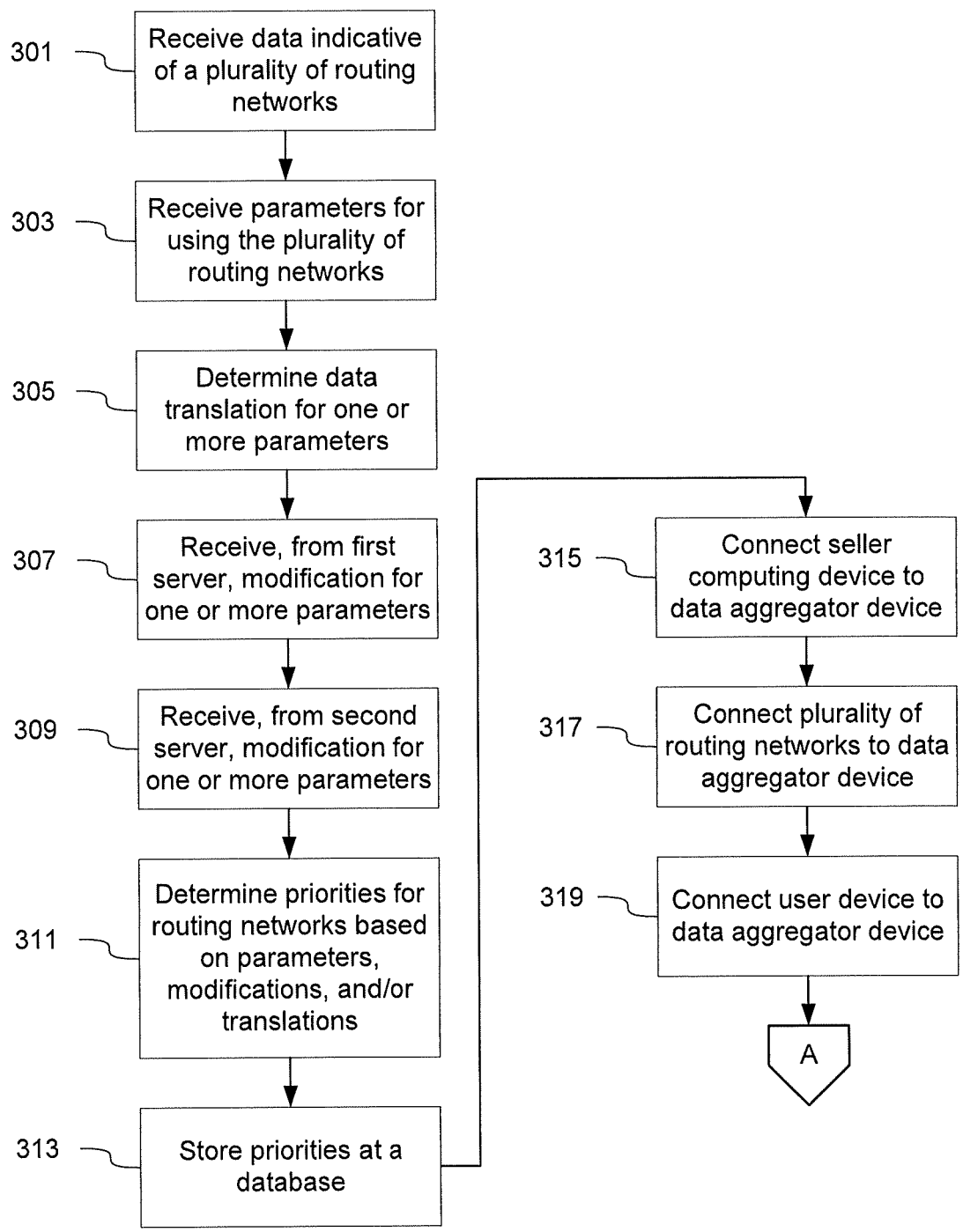
FIGS. 3A-C illustrate an example of at least a portion of a flow diagram for determining one or more routing networks based on location and/or an identification of an item in which various aspects of the disclosure may be implemented.
Figure 3B:
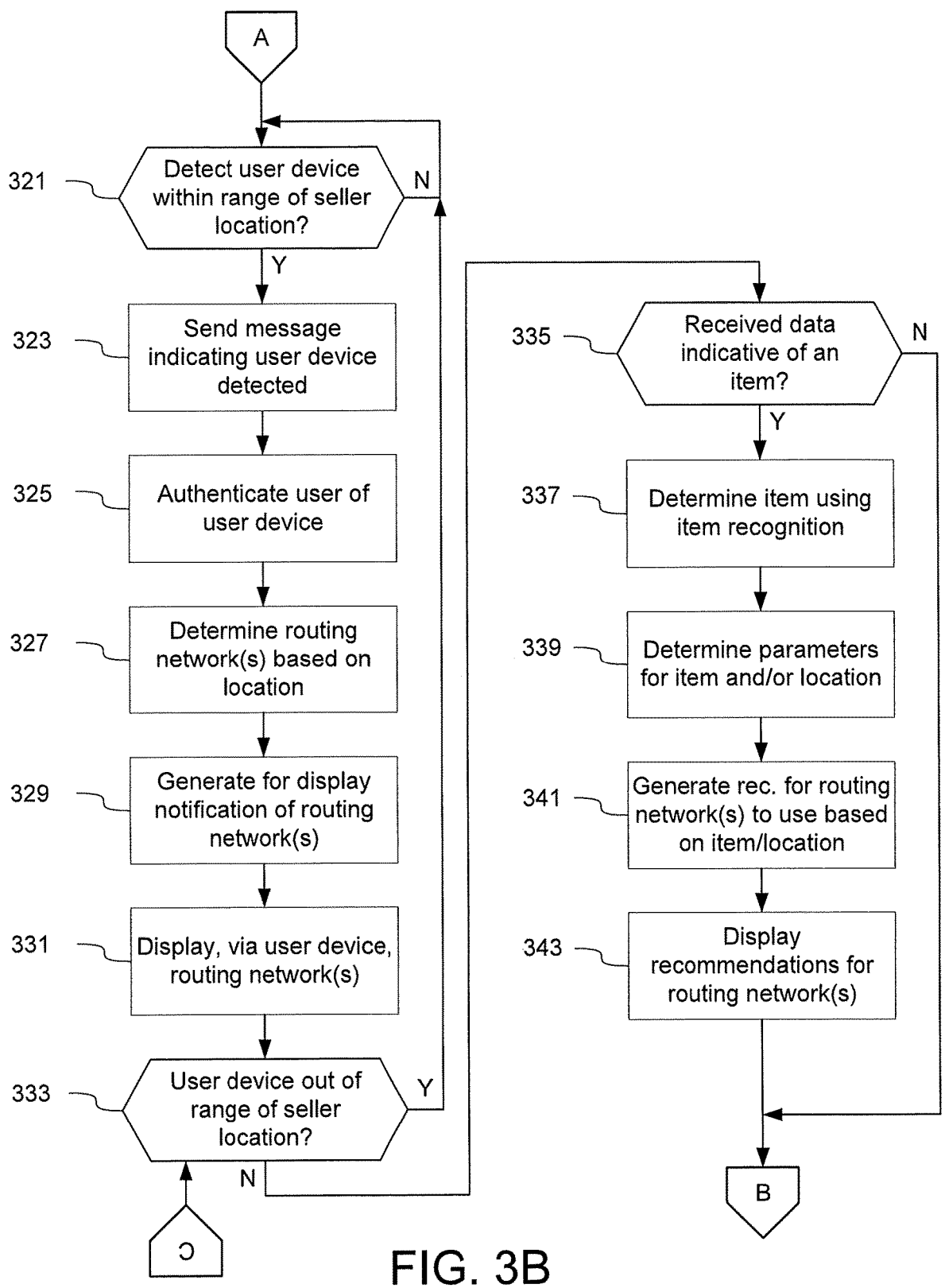
Figure 3C:
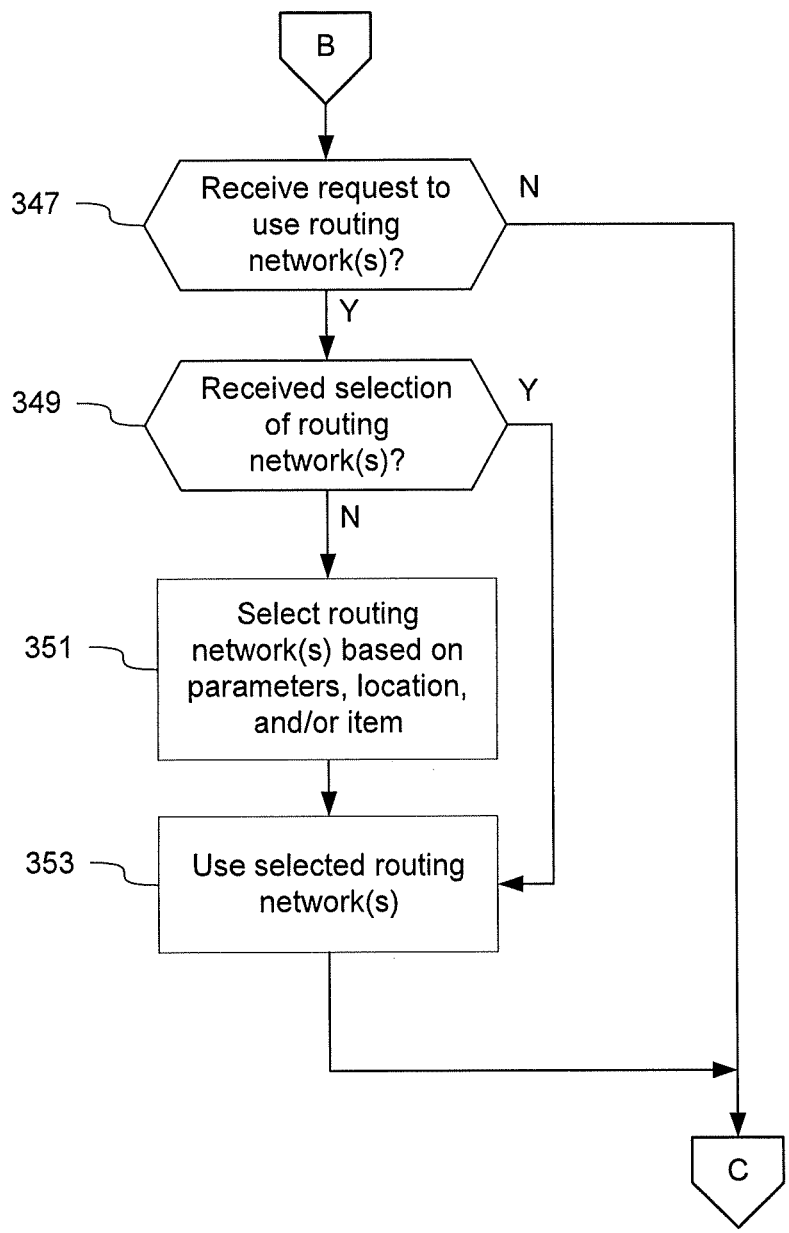

FIGS. 3A-C illustrate an example of at least a portion of a flow diagram for determining one or more routing networks based on location and/or an identification of an item in which various aspects of the disclosure may be implemented.

In step 301, the data aggregation and computing device 101 may receive data indicative of a plurality of routing networks. In some aspects, the plurality of routing networks may comprise electronic networks for routing financial transactions. Moreover, each routing network may correspond to a particular account, such as a credit card account, a debit card account, a savings account, a checking account, and the like. The data indicative of the plurality of routing networks may include, for example, data on various aspects of a particular account, such as rewards (e.g., spending rewards or minimum balance rewards), discounts (e.g., discounts on purchases), bonuses, annual percentage rates (APRs), product protection (e.g., extended warranty, price protection, and the like), or any other aspects of the account. In some aspects, the computing device 101 may receive the data indicative of the plurality of routing networks from a user (e.g., input via a user device 153) and/or from each of the servers 121 and 131 associated with an account. In some aspects, the computing device 101 may receive an indication of the type of account (e.g., credit card with a first issuer), and the computing device 101 may determine the aspects of the account without having to receive the information from the user device 153 or a server 121 or 131. For example, after receiving the indication of the account, the computing device 101 may communicate with third party servers to determine the various aspects of the account (e.g., APRs, bonuses, and the like).

In step 303, the computing device 101 may receive parameters for using the plurality of routing networks. In some aspects, the user may input one or more of the parameters via a user device, such as user device 151 or user device 153. In some aspects, the parameters may comprise goals for optimizing usage of the routing networks, such as the user's spending goals. Optimizing usage of the routing networks may comprise, for example, using the lowest APR (e.g., no APR) accounts, using a credit card with the lowest interest rate, using a debit card, maintaining a minimum balance in a bank account after spending, and the like. Optimizing usage of the routing networks may additionally or alternatively comprise maximizing rewards for using a particular routing network (e.g., cash back rewards, points rewards, airline miles, and the like) and/or maximizing discounts for using a particular routing network (e.g., a certain amount, such as $10, statement credit if the user spends a certain higher amount, such as $75, at a particular store or on a particular item).

In step 305, the computing device 101 may determine data translation information for one or more of the parameters. The rewards and/or awards for each of the plurality of routing networks may comprise a different format, and the computing device 101 may translate each format to use a common metric. For example, the computing device 101 may translate 1 mile earned from credit card A to 2 cents. The computing device 101 may translate 1 point earned from credit card B to 1 cent. The computing device 101 might not translate some currencies. For example, each point (e.g., cent) earned for spending via a cash-back rewards credit card may be equivalent to 1 cent. The user may input, via a user device, the data translation information. Additionally or alternatively, the computing device 101 may access one or more data sources (e.g., database 123, database 133, or data storage 141) to automatically determine the data translation information for each of the routing networks without user input.

In step 307, the computing device 101 may receive, from a first server 121, a modification for one or more of the parameters. The first server 121 may be associated with one or more of the plurality of routing networks (e.g., one or more credit card, debit card, and other accounts owned by the user). The computing device 101 may transmit message (s) to the first server 121, wherein the message(s) indicate the user-specified parameters (e.g., optimization parameters). For example, the user may desire to maximize spending rewards, which may be based on the data translation, and the computing device 101 may transmit an indication thereof to the first server 121. The first server 121 may receive the message(s) and determine whether to modify (e.g., update) the parameters for a particular routing network. For example, the first server 121 may increase spending rewards for a particular credit card owned by the user, such as increasing everyday spending from 1 cent to 1.25 cents. As another example, the first server 121 may increase spending at particular retail stores from 1 cent to 4 cents, such as retail stores the user has visited or is expected to visit. The increase may be for a limited amount of time (e.g., 3 months). The first server 121 may send an indication of the modification for one or more of the parameters to the computing device 101.

In step 309, the computing device 101 may receive, from a second server 131, a modification for one or more of the parameters. The second server 131 may be associated with another one or more the plurality of routing networks. The computing device 101 may transmit message(s) to the second server 131, wherein the message(s) indicate the user-specified parameters (e.g., optimization parameters). For example (and as described above), the user may desire to maximize spending rewards, which may be based on the data translation, and the computing device 101 may transmit an indication thereof to the second server 131. The second server 131 may receive the message(s) and determine whether to modify (e.g., update) the parameters for a particular routing network associated with the second server 131. For example, the second server 131 may increase spending rewards for a particular credit card owned by the user (and associated with the second server 131), such as increasing spending from 1 cent to 3 cents for a particular amount of time (e.g., 1 month). The second server 131 may send an indication of the modification for one or more of the parameters to the computing device 101.

In step 311, the computing device 101 may determine priorities for the plurality of routing networks based on the received parameters, the received modifications, and/or the data translation information. In some aspects, the computing device 101 may assign higher priorities to routing networks with higher spending rewards and/or discounts and may assign lower priorities to routing networks with lower spending rewards and/or discounts. In the above example, the computing device 101 may prioritize the credit card associated with the second server 131 over the credit card associated with the first server 121 for the first month because the credit card associated with the second server 131 offers 3 cents back per dollar spent, whereas the credit card associated with the first server 121 offers less than 3 cents back per dollar spent during the same time frame. On the other hand, the computing device 101 may prioritize the credit card associated with the first server 121 over the credit card associated with the second server 131 across all three months for spending at particular retail stores covered by the credit card associated with the first server 121 (e.g., 4 cents per dollar spent). The computing device 101 may prioritize the credit card associated with the first server 121 over the credit card associated with the second server 131 for the second and third months because of the higher spending rewards. In some aspects, the computing device 101 may determine priorities for the plurality of routing networks based on each routing network's baseline rewards and/or bonuses (e.g., without giving the servers 121 or 131 an opportunity to increase the rewards and/or bonuses, such as in steps 307 and/or 309).

While two credit cards are described above, the computing device 101 may receive information for more than two cards (e.g., all of the user's credit cards, debit cards, and the like), and prioritize the credit cards based on each credit card's respective reward or bonus to the user. In some aspects, the computing device 101 may provide a bidding system for each of the servers, routing networks, and the like. The bidding system may comprise, for example, an auction site for the bidders (e.g., the routing networks or accounts thereof). For example, if a first server increases the spending bonus on a particular credit card, the computing device 101 may transmit a notification to other servers that the first server increased the spending bonus and/or the amount that the first server increased the spending bonus. The computing device 101 may give the other servers an opportunity, e.g., within a particular time period, to out-bid the first server's credit card offer. The bidders may have the ability, through an auction site, to see other bids. The bidding system may be open to all routing networks or may be restricted to allow only some routing networks to submit bids. In some aspects, payment service providers may bid for display prominence or use within a payment device, and consumers may choose the preferred payment service provider at a transaction, product, or merchant level. The bidding system may be opaque to consumers.

In some aspects, the computing device 101 may be a computing device of a card issuer that issues a single card that may enable a plurality (e.g., 5 and/or all) of the user's routing networks to compete for the payment. The consumer may simply use the card issued by the card issuer, with the consumer confident of getting the best deal to optimize a transaction with the consumer's existing cards. The computing device 101 may communicate with the servers 121 and 131 in response to the user using the single card to determine which routing network to use. Alternatively, the computing device 101 may have previously stored the priorities and communicate with the selected routing network in response to use of the common card.

In step 313, the computing device 101 may store the priorities at a database, such as an internal database or an external database (e.g., memory 111 or data storage 141). For example, each available routing network may be assigned a number (e.g., 1, 2, 3, 4, and the like) or other indication of the priority of the routing network relative to other routing networks. The indication of the priority of the routing network, along with an indication of the respective routing network, may be stored for future use, such as when a user activity (e.g., spending activity) is detected. The computing device 101 may also store an association between the routing networks and/or particular seller locations. For example, the computing device 101 may store an indication that account 1, account 2, and account 3 may be used at a seller location A, and an indication that account 2, account 3, and account 4 may be used at a seller location B.

In step 315, the computing device 101 may connect to a seller computing device 169. In some aspects, the seller computing device 169 may comprise a seller's server (e.g., for an online seller), point of sale device, or any other computing device used to facilitate transactions between a seller and a customer. The computing device 101 may authenticate with the seller computing device 169, and the seller computing device 169 may authenticate with the computing device 101. The computing device 101 and the seller computing device 169 may establish a secure communication tunnel (e.g., a secure session connection), such as via a communication handshake procedure. In some aspects, the connection between the computing device 101 and the seller computing device 169 may occur prior to the computing device 101 and the seller computing device 169 transmitting and/or receiving data, such as secured data.

In step 317, the computing device 101 may connect to a plurality of routing networks, such as the first server 121 and/or the second server 131. The computing device 101 may authenticate with the first server 121 and/or the second server 131, and the first server 121 and/or the second server 131 may authenticate with the computing device 101. The computing device 101 and the first server 121 and/or the second server 131 may establish a secure communication tunnel (e.g., a secure session connection), such as via a communication handshake procedure. In some aspects, the connection between the computing device 101 and each of the first server 121 and second server 131 (and other servers associated with routing networks) may occur prior to the computing device 101 and the servers transmitting and/or receiving data, such as secured data (e.g., data associated with the plurality of routing networks).

In step 319, the computing device 101 may connect to a user device (e.g., a mobile device), such as a laptop 151, a mobile phone 153, or any other user device. The computing device 101 may authenticate with the user device 153, and the user device 153 may authenticate with the computing device 101. The computing device 101 and the user device 153 may establish a secure communication tunnel (e.g., a secure session connection), such as via a communication handshake procedure. In some aspects, the connection between the computing device 101 and the user device 153 may occur after a user of the user device 153 has granted permission to the computing device 101 to connect to the user device 153. In some aspects, the connection between the computing device 101 and the user device 153 may occur after the user device is within range of a location, such as a seller location 161.

Proceeding to FIG. 3B, in step 321, the user device 153 and/or a wireless sensing device 165 (e.g., wireless beacon, such as a Bluetooth beacon) or 167 (e.g., wireless access point or near field communication (NFC) sensor) may be used to detect whether the user device 153 is within range of a seller location 161. For example, the user device 153 may transmit information identifying the user device 153 to a wireless sensing device 165 or 167 at the seller location 161 (or vice versa). The information may be transmitted when the user device 153 comes within range (e.g., a threshold range) of a wireless sensing device 165, and the information may be used to detect that the user device 153 is within range of a seller location 161. In some aspects, the location of the user device 153 may be determined using location services of the user device 153, which may be based on, for example, GPS coordinates information, Wi-Fi hotspot information, and/or mobile carrier network information. The user device 153 may be within range of the location 161 based on a threshold distance from the location 161 (e.g., 0 feet, 50 feet, 100 feet, and the like). If the user device 153 is not within range of the location 161 (step 321: N), the method may return to step 321 and wait until the user device 153 is within range of the location 161. If the user device 153 is within range of the seller location 161 (step 321: Y), the method may proceed to step 323.

In step 323, the user device 153, a wireless sensing device 165 or 167, and/or a computing device in communication with the wireless sensing device 165 or 167 may transmit (e.g., send), to the computing device 101, data (e.g., a message) indicating that the user device 153 has been detected. In some aspects, the user device 153 may send the message indicating that the user device 153 is within range of the location 161.

In step 325, the user of the user device 153 may be authenticated. In some aspects, the user device 153 may include a mobile application used to connect the user device 153 to the computing device 101. The user of the user device 153 may authenticate with the computing device 101 by providing authentication information, such as a username and password, biometrics (e.g., fingerprint, facial recognition, and the like), or any other authentication information. The authentication may comprise a single account level authentication, e.g., as opposed to an online banking or application-level authentication.

In step 327, the computing device 101 may determine one or more routing networks based on the location of the user device 153 (e.g., location 161). The computing device 101 may retrieve, from internal memory 111 and/or data storage 141, a listing of the routing network(s) associated with the location 161. The routing network(s) associated with the location 161 may comprise, for example, accounts that the user of the user device 153 may use to make purchases at the location 161. That is, geo-tagging may be used to link accounts to locations. For example, one or more of the user's accounts may be linked to a retail location 161, and the user may make purchases using one or more of the accounts at the retail location 161. The computing device 101 may also associate the one or more routing networks with the user device 153, such as in response to receiving the data indicating that the user device is within range of the location 161. By associating the one or more routing networks with the user device 153, the user device 153 may be permitted to (or recommended to) use the one or more routing networks while at the location 161.

In step 329, the computing device 101 and/or the user device 153 may generate for display a notification of the one or more routing networks determined based on the location. For example, the notification of the one or more routing networks may comprise a listing of the routing network(s) available to the user for the location 161, such as credit card A, credit card B, debit card A, and the like. The generated notification may include other information associated with each routing network. For example, the notification may indicate the amount of rewards for each of the accounts available to the user at the location 161, such as 3% back for each dollar spent on credit card A generally or 4% back for each dollar spent on credit card B at the particular location 161, which may comprise a retail store location. The computing device 101 may generate the display and transmit the generated display to the user device 153 for display or the user device 153 may itself generate the display.

In step 331, the user device 153 may display, on a display device of the user device 153, the notification of the one or more routing networks for the location. If the computing device 101 generated the notification, the user device 153 may display the notification after receiving it from the computing device 101.

In step 333, the user device 153 and/or a wireless sensing device 165 or 167 may be used to determine whether the user device 153 is outside the range of the seller location 161. If the user device 153 is outside the range of the seller location 161 (step 333: Y), the method may return to step 321 to determine whether the user device 153 comes back within range of the seller location 161. The computing device 101 may also disassociate the routing networks determined in step 327, such that the routing networks are not automatically used when the user device 153 is outside the range of the location 161. If the user device 153 is still within range of the seller location 161 (step 333: N), the method may proceed to step 335. As previously described, determining whether the user device 153 is outside the range of the location 161 may be based on communications between a wireless sensing device and the user device 153 (or the lack thereof) and/or the location of the user device 153 determined using location services of the user device 153.

In step 335, the computing device 101 and/or the user device 153 may determine whether data indicative of an item, such as item 171, has been received. The item may comprise, for example, a product or service being sold at the seller's location 161 or a product or service being sold online. The data indicative of the item may comprise, for example, information from the barcode 173, the QR code 175, or any other code used to identify the item 171. For example, the user device 153 may scan, via a camera, the barcode 173 and/or the QR code 175 and may transmit the code information to the computing device 101 for identification of the item 171. Alternatively, the user device 153 may itself identify the item 171 based on the code information and may transmit the identity of the item 171 to the computing device 101. In some aspects, the data indicative of the item may comprise a photograph of the item, which may have been captured by a camera of the user device 153. The data indicative of the item may additionally or alternatively be generated from a search on a search engine made by the user of the user device 153, such as a text search for "kitchen stand mixer." A search engine search may also be based on the image of the item captured by the camera of the user device 153. If data indicative of an item has not been received (step 335: N), the method may proceed to step 347 illustrated in FIG. 3C, which will be described in further detail below. If data indicative of an item 171 has been received (step 335: Y), the method may proceed to step 337.

In step 337, the computing device 101 may determine the item 171 using the data indicative of the item. For example, the computing device 101 may determine the item 171 based on the barcode, QR, or other code information. The computing device may additionally or alternatively use an item recognition technique to identify the item based on an image of the item captured by the user device 153. For example, the computing device 101 may compare the image of the item 171 to other images. If the image of the item 171 includes text, the computing device 101 may use optical character recognition (OCR) to identify the item.

In step 339, the computing device 101 may determine one or more parameters of the routing networks for the identified item 171 and/or the seller location 161. For example, the computing device 101 may determine the amount of rewards for the user if the user purchases the item 171 at the location 161 using a particular credit card, debit card, and the like. The computing device 101 may also determine the balance and/or amount that would be remaining on each account after the user purchases the item 171 and compare the balance and/or amount to a threshold balance and/or amount. The computing device 101 may also determine whether any of the routing networks provides protection for the product, such as extended warranty, accident protection, and the like, and the amount of the protection (e.g., up to $500) or the duration of the protection (e.g., extending the warranty by 1 year).

In some aspects, the computing device 101 may communicate with one or more of the servers 121 and/or 131 after (e.g., in response to) determining that the user is interested in an item 171 (e.g., after receiving data indicative of the item 171). In particular, the servers 121 and/or 131 may be given the opportunity to improve the user's rewards for using a particular payment method. For example (and as previously described), the computing device 101 may provide a bidding system for each of the servers, routing networks, and the like. If the first server 121 increases the spending bonus on a particular credit card, the computing device 101 may transmit a notification to the second server 131 that the first server 121 increased the spending bonus and/or the amount that the first server 121 increased the spending bonus. The computing device 101 may give the second server 131 an opportunity, e.g., within a particular time period, to out-bid the first server's credit card offer. That is, the computing device 101 may facilitate payment providers bidding for the consumer's business based on the consumer's interest in particular items (e.g., by performing a web search of the item).

In step 341, the computing device 101 may generate a recommendation for one or more routing networks to use for transmitting data associated with the item 171 and/or location 161, based on the identity of the item 171 and/or the location 161. The computing device 101 may also generate a display with the recommendation and transmit the generated display to the user device 153. For example, the generated display may list one or more of the routing networks, in addition to the benefits for using each routing network. For example, the display may indicate, for a first credit account, 3% cash back and $500 purchase protection. The display may also indicate, for a second credit account, 1% cash back, $500 purchase protection, and 1 year extended warranty. The display may also indicate, for example, the balance and credit limit for each credit account. As previously described, the display may prioritize the routing networks based on parameters provided by the user. For example, if the user input a preference to prioritize the amount of rewards, the display may list first the payment option that would result in the highest reward. If the user input a preference to prioritize an extended warranty, the display may list first the payment option that would result in the longest extended warranty. In some aspects, the display might only list a single payment option (e.g., the optimal payment option).

In step 343, the user device 153 may receive the generated display and display, on a display device of the user device 153, the recommendation for the one or more recommended routing networks.

Proceeding to FIG. 3C, in step 347, the computing device 101 may determine whether it has received a request to use one or more of the recommended routing networks. For example, the user of the user device 153 may desire to purchase the item 171 using one or more of the recommended routing networks and may select, via the application on the user device 153 or via a seller computing device 169, one or more of the routing networks (e.g., at checkout). The user device 153 and/or the seller computing device 169 may transmit the selection to the computing device 101. If the computing device 101 has not received a request to use one or more of the recommended routing networks (step 347: N), the method may return to step 333 illustrated in FIG. 3B, and previously described. If the computing device 101 has received a request to use one or more of the recommended routing networks (step 347: Y), the method may proceed to step 349.

In step 349, the computing device 101 may determine whether it has received, such as from the user device 153 or the seller computing device 169, a selection of one or more of the recommended routing networks. For example, the computing device 101 may use the routing network selected by the user or may use a default routing network. If the computing device 101 has not received a user selection (step 349: N), the method may proceed to step 351. If, on the other hand, the computing device 101 has received a user selection (step 349: Y), the method may proceed to step 353.

In step 351, the computing device 101 may select the routing network(s) to use for the purchase of the item 171 based on one or more parameters, the location 161, and/or the item 171. For example, if the user or seller did not indicate a selection of one or more of the routing networks to use, the computing device 101 may use one or more default routing networks, such as to optimize the parameters previously selected by the user (e.g., greatest rewards, product protection, and the like). In some aspects, the option to automatically make a payment may be user-configurable (e.g., via a toggle), so that the user can decide whether or not to decide on a particular payment option or to default to a particular payment option, resulting in a quicker and more efficient use of the routing networks.

In step 353, the computing device 101 may use the routing network(s) selected by the user of the user device 153 (or default routing network(s)) for purchasing the item 171. For example, the computing device 101 may communicate with the server (e.g., first server 121 or second server 131) corresponding to the selected routing networks to make the payment. In some aspects, two or more routing networks may have been selected, and the computing device 101 may communicate with each of the servers corresponding to the two or more routing networks. The user may specify, for each routing network, the amount to use for the transaction. In some aspects, the computing device 101 may divide up the payment across a plurality of routing networks if, for example, a spending limit on one of the routing networks is close to being reached or would be exceeded if the entire payment is made using that routing network. As previously described, the payments may also be split up in order to optimize (e.g., maximize) the user's selected priorities. For example, consumers may have multiple rewards credit cards, and each credit card may have different reward caps. The computing device 101 may place spending on one of these credit cards until the reward cap is met, and place spending on the next best credit card.

Figure 4A:
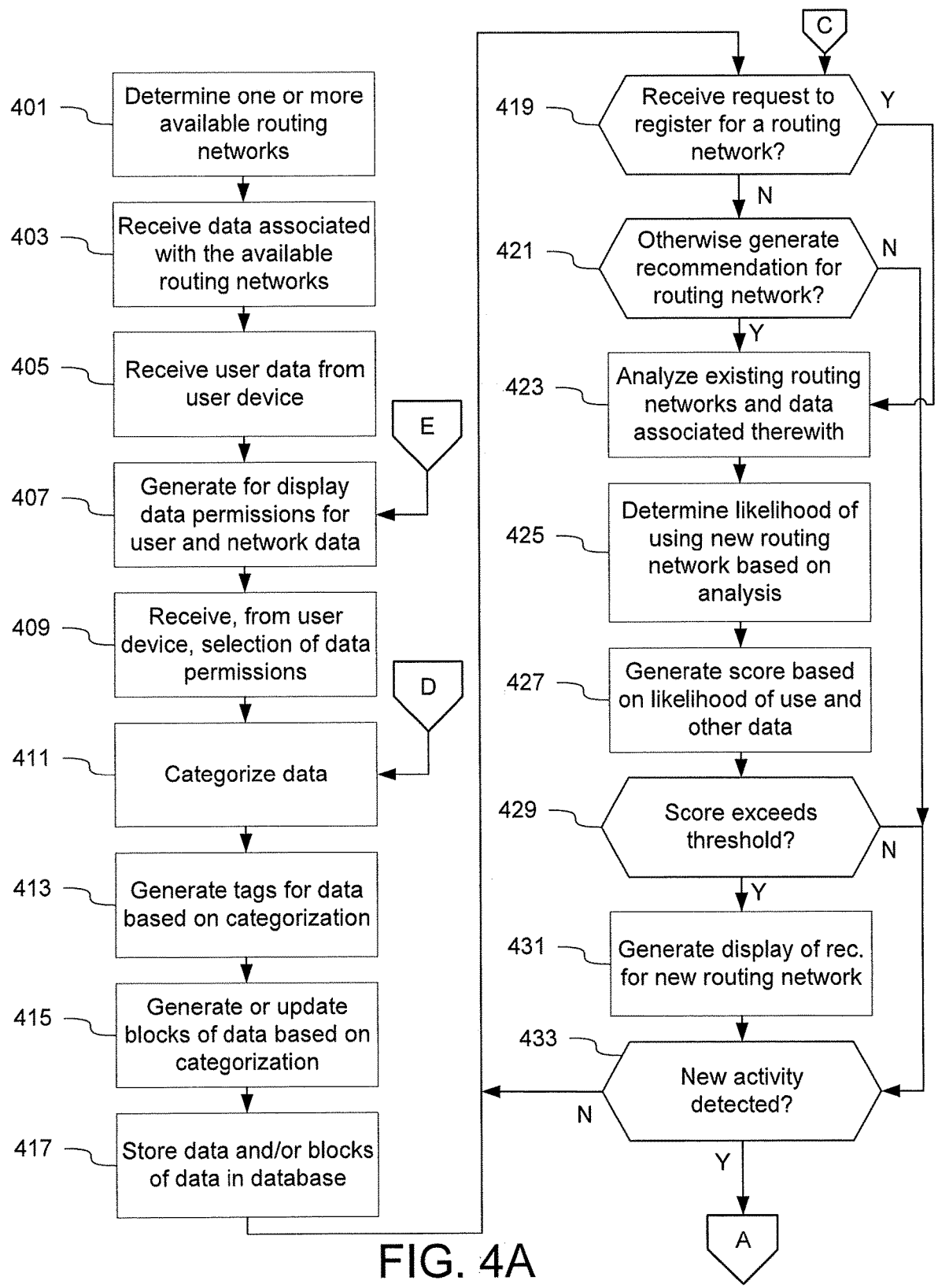
FIGS. 4A-C illustrate an example of at least a portion of a flow diagram for processing and aggregating data from a plurality of data sources and performing one or more actions based on the processed and aggregated data in which various aspects of the disclosure may be implemented.
Figure 4B:
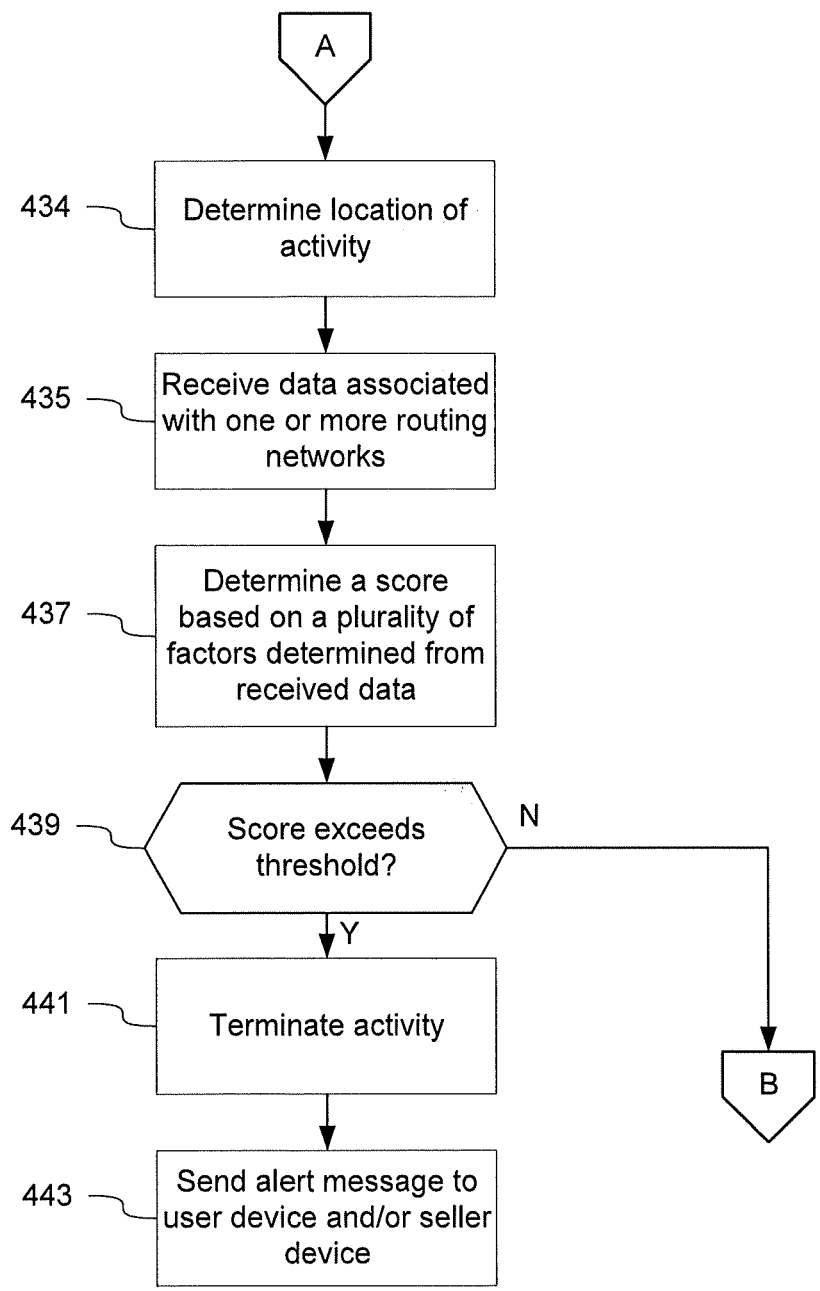
Figure 4C:
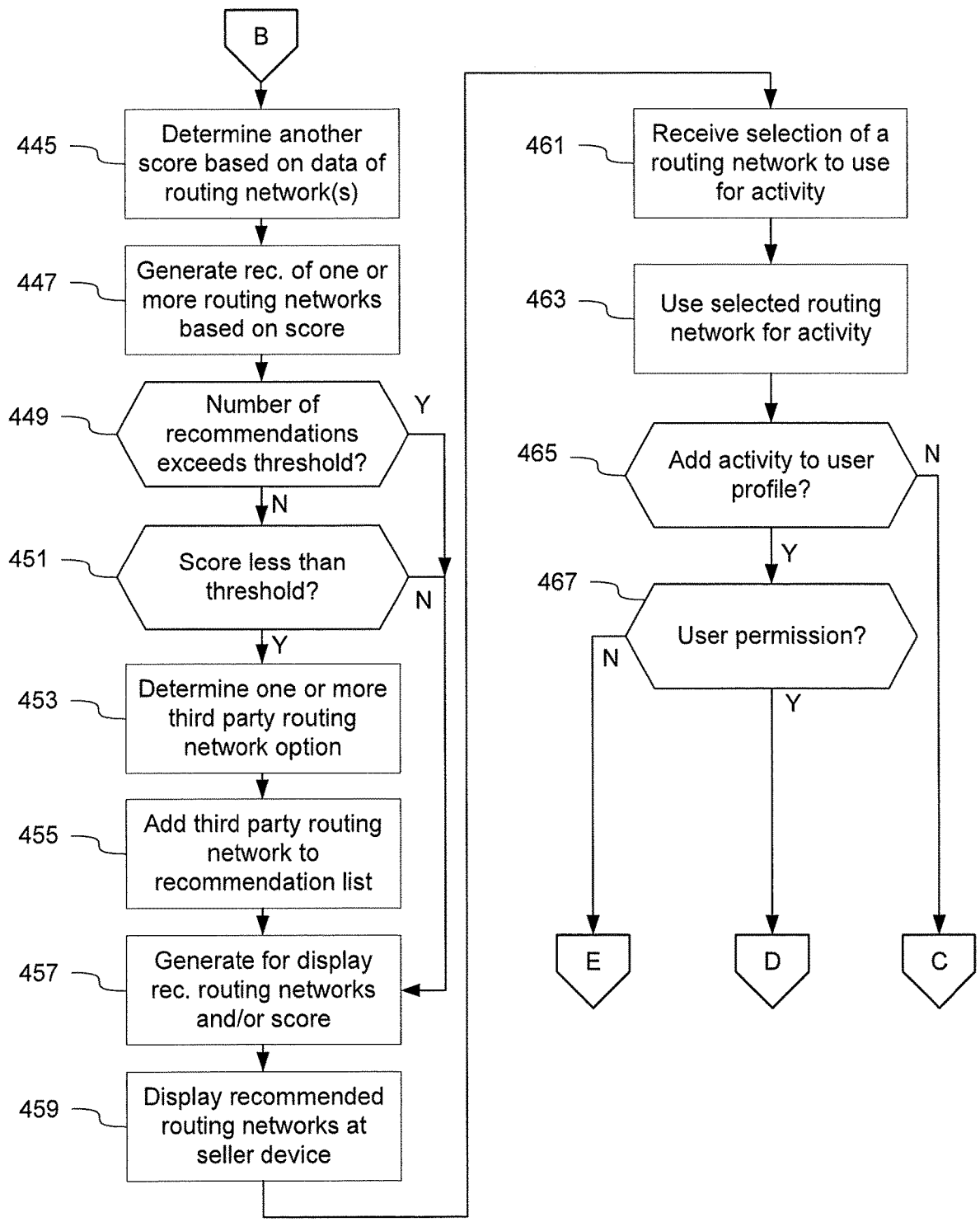

FIGS. 4A-C illustrate an example of at least a portion of a flow diagram for processing and aggregating data from a plurality of data sources and performing one or more actions based on the processed and aggregated data in which various aspects of the disclosure may be implemented.

In step 401, a data aggregation and computing device 101 may determine one or more available routing networks. The one or more available routing networks may comprise electronic networks for routing financial transactions. Each routing network may correspond to a particular account of a user (e.g., the user of the user device 153), such as a credit card account, a debit card account, a savings account, a checking account, and the like.

In step 403, the computing device 101 may receive data associated with the one or more available routing networks. The data associated with each routing network may comprise, for example, transaction data for that account, such as transaction date, transaction amount, parties of the transaction, and the like. The data may also comprise, for example, a current balance of the account, a historical balance of the account, a minimum balance for the account, a maximum balance for the account, and/or threshold balances for the account.

As previously described, the computing device 101 may establish secure connections with one or more servers associated with one or more routing networks (e.g., server 121, server 131, or other servers). After establishing the secure connection(s), the computing device 101 may receive data associated with the one or more routing networks.

In step 405, the computing device 101 may receive user data from a user device (e.g., a mobile device), such as a laptop 151, a mobile phone 153, or any other user device. In some aspects, the user data may comprise data that the user inputs via the user device 153. The inputted data may include additional data associated with one or more of the available routing networks (e.g., additional transaction information and/or balance information). The user data may also comprise data generated by one or more sensors of the user device 153, such as location data for the user device 153 (e.g., generated by location services using GPS, cellular, and/or Wi-Fi networks).

In step 407, the computing device 101 and/or the user device 153 may generate for display data permissions for using (e.g., sharing) the user data and/or the data associated with one or more of the available routing networks. The generated display may display to the user a plurality of types of data (e.g., location data, transaction data, or other data) that the user may share with third parties. For example, the display may include a toggle or other graphical user interface (GUI) element for each type of data, which the user may select or deselect to indicate whether to share the data. In some aspects, the user device 153 may generate the permissions display and display it on a display of the user device 153, such as via an application installed on the user device 153. In some aspects, the computing device 101 may generate the permissions display and transmit the display to the user device 153. The user device 153 may receive the permissions display and display it on a display of the user device 153.

In step 409, the computing device 101 may receive, from the user device 153, a selection of data permissions. For example, the user may use the toggles (or other GUI elements) to select whether to permit sharing of that particular data or data type with third parties. In some aspects, the user may select an option to permit sharing of all of the user's data or data types or an option to prevent sharing any of the user's data or data types. The computing device 101 may store the user's selected permissions in, for example, an internal database (e.g., memory 111) or an external database (e.g., in the data storage 141). As a result, the computing device 101 may provide a user the ability to control access to their data, including financial data, at a granular level, rather than having a company setting the terms of data usage. That is, the user may be provided a one-stop shop for the user to be in control of his or her own data and permit access to third parties.

In step 411, the computing device 101 may categorize the user data and/or the data associated with one or more of the available routing networks. In some aspects, the data may be categorized by the data type, such as location data, transaction data, balance data, and the like. In some aspects, the computing device 101 may categorize the data by permissions, such as data that may be shared with third parties and data that may not be shared with third parties. In some aspects, the data may be categorized based on the third parties for which the data may be shared. For example, some of the data, such as balance data and some of the transaction data, may be relevant for the user to obtain a mortgage, and the computing device 101 may categorize this data as data to be shared with a mortgage company if requested.

In step 413, the computing device 101 may generate, based on the categorization, tags for the user data and/or the data associated with one or more of the available routing networks. The tags may indicate the categorization of the data. For example, a location tag generated for a piece of data may indicate that the piece of data comprises location data. A transaction tag generated for a piece of data may indicate that the piece of data comprises transaction data. A balance tag generated for a piece of data may indicate that the piece of data comprises account balance data. A permission tag generated for a piece of data may indicate that the piece of data may be shared with third parties. A no permission tag generated for a piece of data may indicate that the piece of data may not be shared with third parties. A mortgage tag generated for a piece of data may indicate that the piece of data may be shared with mortgage companies if the data is requested. Numerous other similar tags may be used.

In step 415, the computing device 101 may generate or update blocks of data based on the categorization and/or tags. Each block of data may comprise a group of data having the same (or related) tags. For example, the computing device 101 may generate a block of data for data having the location tag. The computing device 101 may generate a block of data for data having the transaction tag. The computing device 101 may generate a block of data for data having the balance tag. The computing device 101 may generate a block of data for data having the permission tag. The computing device 101 may generate a block of data for data having the no permission tag. The computing device 101 may generate a block of data for data having the mortgage tag. The computing device may generate a block of data for any other tags.

In step 417, the computing device 101 may store the data and/or the blocks of data in a database, such as an internal database (e.g., memory 111) or an external database (e.g., in the data storage 141). As will be described in further detail below, the stored data and/or blocks of data may be shared with third parties when requested. That is, the computing device 101 may store or facilitate storage of a personal data vault for the user (and other users), and the personal data value may aggregate data from various data sources, as previously described. The computing device 101 may be used as a single hub for data aggregation and/or control of third party access to the user's (and other users' data). The computing device 101 may store the data and/or blocks of data with the corresponding tag and/or permissions. By storing the data and/or blocks of data with the corresponding tag and/or permissions, the computing device 101 may quickly and efficiently retrieve data to be shared, which improves the speed and accuracy of the computing device 101 accessing data from the databases and transmitting the data to third parties. The speed and accuracy of accessing and transmitting relevant data may be further improved by storing and retrieving the data in blocks, instead of as individual pieces of data.

In step 419, the computing device 101 may determine whether it received a request to register the user for a routing network, such as a new routing network. For example, the user may input, via a user device 153, a request to register for a new account, such as a new credit card account. The request may be transmitted, by the user device 153, to the computing device 101. The computing device 101 may receive the request and determine that the user has requested to register for a new account (step 419: Y). On the other hand, if the computing device 101 has not detected a request to register for a new account (step 419: N), the computing device 101 may proceed to step 421.

In step 421, the computing device 101 may determine whether to otherwise generate, for the user, a recommendation for a new routing network even if the user did not request to register for a new routing network. If not (step 421: N), the method may proceed to step 433, as will be described in further detail below. If the computing device 101 determines to generate a recommendation for a new routing network (step 421: Y), the method may proceed to step 423.

In step 423, the computing device 101 may retrieve and analyze the user's existing (or prior) routing networks and data associated with those existing routing networks. For example, the computing device 101 may access the previously-stored data, such as transaction data, balance data, and the like. In some aspects, the computing device 101 may analyze, based on the data associated with the existing routing networks of the user, the user's spending habits and/or the types of accounts the user has.

In step 425, the computing device 101 may determine the likelihood of the user using the new routing network based on the analysis. The likelihood of user may be determined relative to other routing networks already available to the user. For example, the computing device 101 may analyze the transaction data to determine, for example, the amount of spending of the user using a particular account during an opening promotional period (e.g., 3 months after a credit card is open) to the amount of spending of the user during later time periods. If the difference between the user's spending during the opening promotional period and the amount of spending during a later time period exceeds a threshold, the computing device 101 may determine a low likelihood (or a value indicative of a low likelihood) of the user using a new credit card. Otherwise, the computing device 101 may determine a high likelihood (or a value indicative of a high likelihood) of the user using the new credit card. The computing device 101 may also analyze the length that each account has been open. For example, the computing device 101 may determine the length of time that each of the user's current and/or past credit card accounts has been open. The computing device 101 may also determine a metric, such as average or median length of time. If the length of time (or metric thereof) exceeds a threshold length of time, the computing device 101 may determine a high likelihood (or a value indicative of a high likelihood) of the user using the new credit card. Otherwise, the computing device 101 may determine a low likelihood (or a value indicative of a low likelihood) or a medium likelihood (or a value indicative of a medium likelihood) of the user using the new credit card. In some aspects, the new routing network may be associated with, for example, a server associated with one or more of the user's existing routing networks. Alternatively, the new routing network may be associated with, for example, a new server not associated with one or more of the user's existing routing networks. The computing device 101 may establish a secure communication tunnel with the new server so that the computing device 101 and the new server may securely communicate data regarding the user and/or the new routing network.

In step 427, the computing device 101 may generate, for the user, a score based on the likelihood of the user using the new routing network and/or based on one or more other pieces of data. The score may comprise the value indicative of a low, medium, or high likelihood of the user using a new routing network. Any other types of scores may be used, such as on a scale of 1-10 or 1-100. The computing device 101 may also factor in other pieces of data (e.g., factors) to determine the score, such as the user's credit rating (e.g., based on various factors, such as past due payments) and/or top of the wallet factors. If the user has a low credit rating, the computing device 101 may decrease the score. If the user has a high credit rating, the computing device 101 may increase the score.

In step 429, the computing device 101 may determine whether the generated score exceeds a threshold score. If the generated score does not exceed the threshold score (step 429: N), the method may proceed to step 433 (e.g., without recommending or registering the user for the new routing network). If the generated score exceeds the threshold score (step 429: Y), the method may proceed to step 431.

In step 431, the computing device 101 or the user device 153 may generate for display a recommendation for the new routing network. The display may identify the new routing network (e.g., a new credit card), the benefits of the new routing network (e.g., spending rewards, opening bonuses, product protection, travel protection, and the like), and one or more options for the user to indicate to register for the new routing network. In some aspects, the computing device 101 may automatically register the user for the new routing network if the user previously indicated an interest in registering for the new routing network (e.g., a preapproval). The generated display may be displayed on a display of the user device 153.

In step 433, the computing device 101 may determine whether new activity has been detected. New activity may comprise a request to use one or more routing network. For example, the activity may be a new transaction and/or a request for a new transaction. The computing device 101 may receive an indication of the new activity from the user device 153, a seller computing device 169, or another computing device. Additionally or alternatively, the new activity may comprise a request to register for a new routing network. If new activity has not been detected (step 433: N), the method may return to step 419. If new activity has been detected (step 433: Y), the method may proceed to step 434 illustrated in FIG. 4B.

Proceeding to FIG. 4B, in step 434, the computing device 101 may determine the location of the detected activity. For example, the request for new activity may include a location of the requestor, such as the location of the user device 153 if it requested the new activity, the location 161 if the seller computing device 169 requested the new activity, or the location of another computing device that requested the new activity. As previously described, the location of the requesting device may be based on communications between a wireless sensing device 165 or 167 and the requesting device (which may be user device 153) and/or the location of the requesting device determined using location services of the requesting device. If the request for new activity does not include the location information, the computing device 101 may transmit a message to the requesting device requesting the location of the requesting device.

In step 435, the computing device 101 may receive data associated with one or more routing networks, such as the routing network(s) associated with the new activity. For example, the new activity may comprise a purchase requesting use of a particular credit card account. The computing device 101 may access previously-stored data, such as transaction data, balance data, and the like, for the routing network(s) associated with the new activity and/or associated with the user. In some aspects, the computing device 101 may transmit a request for the data associated with the one or more routing networks from one or more servers associated with the one or more routing networks. As will be described in further detail below, the computing device 101 may detect unauthorized use of a routing network by analyzing a plurality of routing networks (including the routing network being used or attempted to use), resulting in a more accurate system for detecting unauthorized use of routing networks. For example, the computing device 101 may analyze the user's credit and debit card products to detect potential unauthorized use of a credit card or a debit card.

In step 437, the computing device 101 may determine a score based on a plurality of factors determined from the data associated with the one or more routing networks. For example, the computing device 101 may determine historical spending habits of the user from the data associated with the one or more routing networks. The computing device 101 may compare the new activity to the user's historical spending habits to determine whether the activity appears to be unauthorized. The computing device 101 may also compare the location of the new activity to locations of previous user activities to determine whether the new activity appears to be unauthorized. The computing device 101 may assign a score to the new activity. In some aspects, higher scores may indicate authorized activity, whereas lower scores may indicate unauthorized activity.

In step 439, the computing device 101 may determine whether the score exceeds a threshold score. If the score does not exceed the threshold score (step 439: N), the method may proceed to step 445 illustrated in FIG. 4C, which will be described in further detail below. If the score does exceed the threshold score (step 439: Y), the method may proceed to step 441.

In step 441, the computing device 101 may terminate the activity. For example, the computing device 101 may prevent a payment using a particular account from processing. In particular, a low enough score may indicate unauthorized use of the routing network(s), such as if the user's device 153, credit card, credit card information, or other information has been stolen and has been used by another person.

In step 443, the computing device 101 may send an alert message to a user device 153 and/or seller computing device 169 indicating termination of the activity and the potential unauthorized use. The alert message may indicate that the new activity exceeds a threshold score. The computing device 101 may also transmit an alert to the server associated with the compromised routing network (e.g., server 121 or server 131).

Proceeding to FIG. 4C, in step 445, the computing device 101 may determine another score (e.g., a risk score) based on data of one or more of the routing networks. The computing device 101 may access previously-stored data, such as transaction data, balance data, and the like, for the routing network(s) associated with the new activity and/or associated with the user. The risk score may indicate the level of risk of the user in connection with one or more of the routing networks and may be used by the computing device 101 to decide to use a third party routing network option, as will be described in further detail below.

In step 447, the computing device 101 may generate a recommendation of one or more routing networks based on the generated score. The routing networks may include payment options, such as credit cards or debit cards, and their associated accounts. For example, if the score determined in step 445 indicates that the user is low risk, the computing device 101 may recommend using a credit card and/or a debit card for the transaction. If the score indicates that the user is high risk, the computing device 101 may recommend using a debit card, but not a credit card, for the transaction.

In step 449, the computing device 101 may determine whether the number of recommended routing networks exceeds a threshold. The threshold number may be 0, 1, or more than 1. If the number of recommended routing networks exceeds a threshold (step 449: Y), the computing device 101 may proceed to step 457, as will be described in further detail below. For example, if the threshold is 2, and the number of recommended routing networks is 3 (e.g., two credit cards and a debit card), the computing device 101 may proceed to step 457. If the number of recommended routing networks does not exceed the threshold (step 449: N), the computing device 101 may proceed to step 451. For example, the threshold may be 2, and the number of recommended routing networks may be 1 (e.g., a single debit card).

In step 451, the computing device 101 may determine whether the score (e.g., determined in step 445) is less than a threshold score. If the score is not less than a threshold score (step 451: N), the computing device 101 may proceed to step 457. If the score is less than the threshold score (step 451: Y), the computing device 101 may proceed to step 453.

In step 453, the computing device 101 may determine one or more third party routing network options, which may be different from the routing networks included on the preliminary list of network routing options. For example, the third party routing network option may include a third party automated clearing house (ACH). The ACH routing may use one or more of the user's existing debit card routing networks. The system described herein may expand sellers' abilities to accept ACH-based payments. This may result in offering sellers a lower-cost alternative to debit routing, such as by by-passing a card network.

In step 455, the computing device 101 may add the one or more third party routing network options to the list of recommended routing networks. For example, the computing device 101 may add the routing network for the third party ACH to the list of recommended routing networks. In some aspects, the third party ACH may offer the seller a lower cost alternative to routing via a card network (e.g., a debit card network).

In step 457, the computing device 101 may generate for display the list of recommended routing networks. In some aspects, the list may include the third party routing network determined in step 453, if applicable. The computing device 101 may send the list of recommended routing networks to the seller computing device 169. The computing device 101 may also send the score determined for the user.

In step 459, the seller computing device 169 may display, on a display of the computing device 169, the list of recommended routing networks, which may include the third party routing network, if applicable.

In step 461, the computing device 101 may receive, such as from the seller computing device 169, a selection of one or more routing network to use for the activity. In some aspects, using the ACH network may be less risky than using another type of routing network, such as a credit card network. Accordingly, if the score is less than a threshold risk score, the seller, via an input device of the seller computing device 169, may select the ACH network to use for the sale.

In step 463, the computing device 101 may use the selected routing network(s) for the activity. For example, the computing device 101 may communicate with the server (e.g., first server 121 or second server 131) corresponding to the selected routing network(s) to make the payment. In some aspects, two or more routing networks may have been selected, and the computing device 101 may communicate with each of the servers corresponding to the two or more routing networks. If the third party routing network was selected, the computing device 101 may communicate with the server corresponding to the third party routing network to make the payment.

In step 465, the computing device 101 may determine whether to add the activity (or data thereof) to the user's profile, such as into one of the blocks of data stored by the computing device 101. For example, transaction data for a sale may be added to one of the blocks of data, and the block of data (including the new transaction data) may be transferred to a third party device in the future and upon request. If the computing device determines not to add the activity to the user's profile (step 465: N), the method may return to step 419, as illustrated in FIG. 4A. If the computing device 101 determines to add the activity to the user's profile (step 465: Y), the computing device 101 may proceed to step 467.

In step 467, the computing device 101 may determine if it has permission from the user to add the activity to the user profile and/or to transmit the activity data to other parties. If the computing device 101 does not have permission (step 467: N), the computing device 101 may proceed to step 407 illustrated in FIG. 4A to obtain permission from the user. If the computing device 101 has permission (step 467: Y), the computing device 101 may proceed to step 411 illustrated in FIG. 4A to categorize the data, generate tags, and/or update the blocks of data with the data for the new activity.

Figure 5:
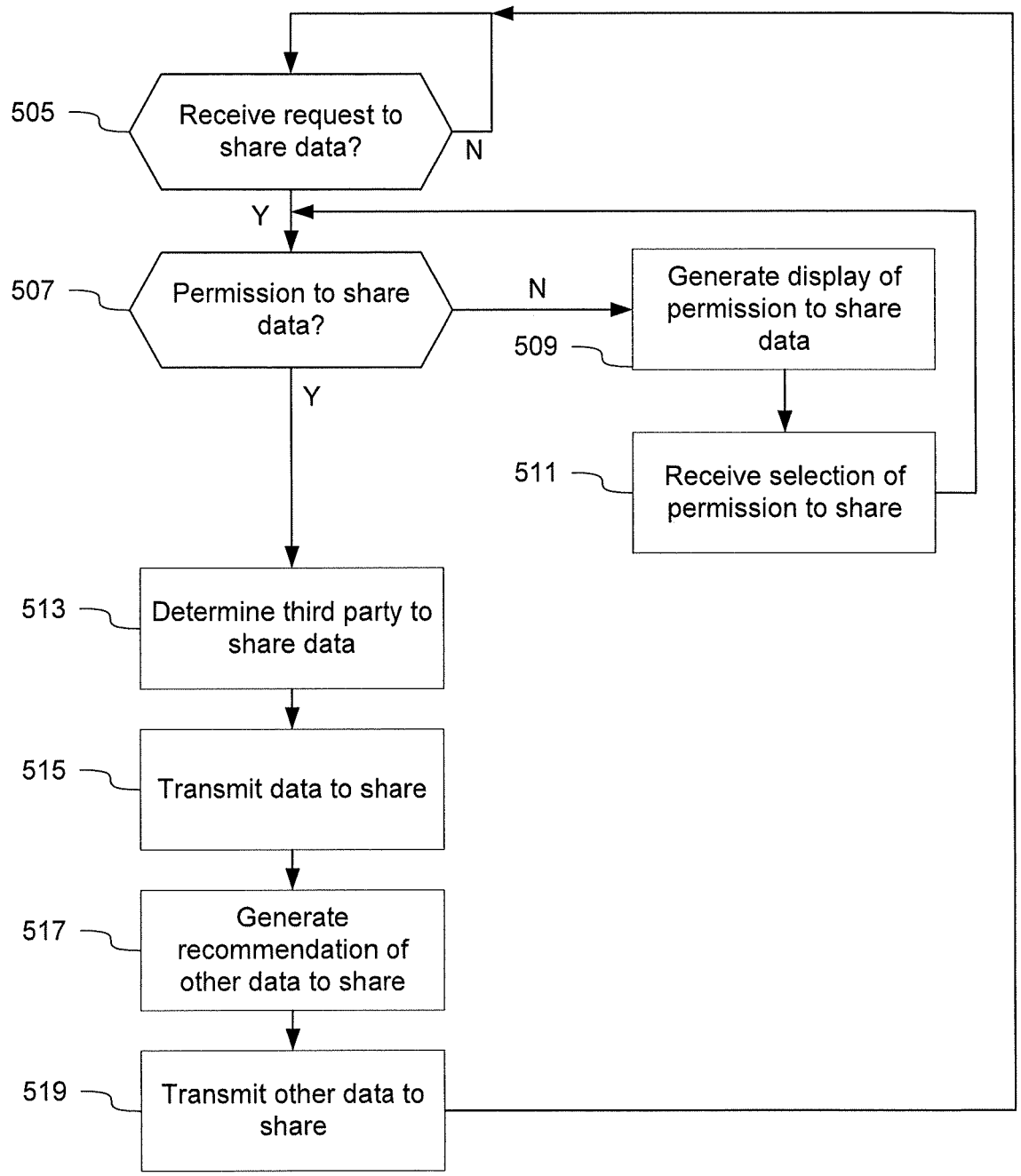
FIG. 5 illustrates an example of at least a portion of a flow diagram for generating recommendations for and transmitting data to a third party in which various aspects of the disclosure may be implemented.

FIG. 5 illustrates an example of at least a portion of a flow diagram for generating recommendations for and transmitting data to a third party in which various aspects of the disclosure may be implemented.

In step 505, a data aggregation and computing device 101 may determine whether it has received a request to share data, such as with a third party. The computing device 101 may determine whether it has received the request from a user, such as via user device 153, or a computing device (e.g., server) of the third party. The computing device (e.g., server) of the third party may be different from the server 121 and/or the server 131. That is, data from the server 121, the server 131, the user device 153, or other data associated with the user may be received and aggregated by the data aggregation and computing device 101 and shared with third party servers. For example, a third party may comprise a mortgage or other financing company. The third party may comprise a financial services company, such as a wealth management company. The request may identify the data to share, the type of data to share (e.g., based on categorization or tag), and/or the third party to share the data with. If the computing device 101 has not received a request to share data (step 505: N), the computing device 101 may wait to receive a request to share data. If the computing device 101 receives a request to share data (step 505: Y), the computing device may proceed to step 507.

In step 507, the computing device 101 may determine whether it has permission from the user to share the data with the third party. For example, the user, via the user device 153, may have previously granted permission to share user data and/or data associated with one or more routing networks (e.g., in steps 407 and 409). The computing device 101 may access the user's permissions from an internal database (e.g., memory 111) of the computing device 101 or an external database (e.g., in the data storage 141). For example, the computing device 101 may determine whether the user previously granted permission to share the requested data and/or the requested data types and whether the user previously granted permission to share the data with that particular third party. If the computing device 101 has permission (step 507: Y), the computing device 101 may proceed to step 513, as will be described in further detail below. If the computing device 101 does not have permission to share the data (step 507: N), the computing device 101 may proceed to step 509 to obtain permission.

In step 509, the computing device 101 and/or the user device 153 may generate a display requesting permission to share the data. The generated display may display to the user an indication of the data to be shared with the third party, the types of data to be shared with the third party, and/or an identity of the third party. For example, the display may include a toggle or other graphical user interface (GUI) element for each piece of data or type of data, which the user may select or deselect to indicate whether to share the data with the third party. In some aspects, the user device 153 may generate the permissions display and display it on a display of the user device 153, such as via an application installed on the user device 153. In some aspects, the computing device 101 may generate the permissions display and transmit the display to the user device 153. The user device 153 may receive the permissions display and display it on a display of the user device 153.

In step 511, the computing device 101 may receive a response from the user device 153 indicating whether or not to share the data with the third party. For example, the user may use the toggles (or other GUI elements) to select whether to permit sharing of particular data or data types with the third party. The user device 153 may transmit the user's selections to the computing device 101. The computing device 101 may determine, in step 507, whether the response from the user device 153 indicates permission to share the data with the third party.

In step 513, the computing device 101 may determine the third party to share the data with. In some aspects, the request (e.g., received in step 505) may include an indication of the third party (e.g., a mortgage company), and the computing device 101 may determine the third party based on the indication in the request.

In step 515, the computing device 101 may transmit, to the third party, the data to share. In some aspects, the computing device 101 may determine which data to share based on information in the request, such as specific data requested and/or types of data requested (e.g., based on categorization and/or tags). If the request indicated types of requested data, the computing device 101 may access the data corresponding to the indicated types of data (e.g., mortgage data, location data, transaction data, balance data, or another type of data) and transmit the data to the third party over a secure communication channel (e.g., a secure tunnel). In some aspects, the computing device 101 may access previously-stored data block(s) corresponding to the requested type(s) of data (e.g., instead of individually identifying the data to be transmitted) and transmit the data block(s) to the third party computing device. In some aspects, the computing device 101 may determine the data to share with the third party based on the identity of the third party, which may have been included in the data request. For example, if the third party is a mortgage company, the computing device 101 may determine to transmit the data blocks having tags identifying balance data and/or mortgage data.

In step 517, the computing device 101 may generate a recommendation of other data to share with the third party. The recommendation may be based on the data requested to be shared with the third party and/or the data actually shared with the third party. For example, if a third party requested data, but the user granted permission for only a portion of the requested data, the computing device 101 may generate a recommendation to share the remainder of the requested data, such as by transmitting a request to the user device 153 identifying the remaining data and permission to share the remaining data. Additionally or alternatively, the computing device 101 may determine data similar to the remaining data to share with the third party, but for which the user has granted permission. For example, the remaining data may be more recent data (e.g., data from the user's most-recent account statement), but the user might not have yet granted permission to share the more recent data. Instead, the computing device 101 may determine to share older data (e.g., data from the user's previous statement(s)) for which the user may have granted permission to share.

In some aspects, the data to be shared may include additional data the third party may have missed. For example, a third party (e.g., a mortgage company) may have requested data or data blocks having the mortgage data tag. However, balance data might be relevant to the user obtaining a mortgage. The computing device 101 may generate a recommendation to also share the balance data with the mortgage company (e.g., if the balance data was not already included in the mortgage data).

In step 519, the computing device 101 may transmit the other data to the third party. Prior to transmitting the other data to the third party, the computing device 101 may determine whether it has permission to share the other data (e.g., similar to step 507 described above). In some aspects, the computing device 101 may transmit the other data with the data requested by the third party (e.g., in step 515). In the mortgage company example, the computing device 101 may provide most (e.g., all) of the data needed for the user to apply for a mortgage from a third party entity. The third party may access the data via an application program interface (API).

Various aspects described herein may be embodied as a method, an apparatus, or as computer-executable instructions stored on one or more non-transitory and/or tangible computer-readable media. Any and/or all of the method steps described herein may be embodied in computer-executable instructions stored on a computer-readable medium, such as a non-transitory and/or tangible computer readable medium and/or a computer readable storage medium. Additionally or alternatively, any and/or all of the method steps described herein may be embodied in computer-readable instructions stored in the memory and/or other non-transitory and/or tangible storage medium of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A system comprising:
a user device of a user configured to transmit, to a computing device, data indicative of a first routing network and data indicative of a second routing network;
the computing device comprising:
a processor; and
memory storing computer-executable instructions that, when executed by the processor, cause the computing device to:
receive, from the user device, the data indicative of the first routing network and the data indicative of the second routing network;
determine, based on the data indicative of the first routing network, a plurality of parameters for the first routing network;
determine, based on the data indicative of the second routing network, a plurality of parameters for the second routing network;
generate a secure session connection between the computing device and a server associated with the second routing network;
receive, from the server and via the secure session connection between the computing device and the server associated with the second routing network, a modification to one or more parameters of the plurality of parameters for the second routing network;
determine priorities for the first routing network and the second routing network based on first and second baseline rewards, respectively, and prevent first and second servers associated with the first and second routing networks from increasing the first and second baseline rewards, respectively;
store, at a database, the priorities for the first routing network and the second routing network;
receive a user parameter, wherein the user parameter is indicative of a desired benefit for the user;
when an activity is detected, retrieve the priorities from the database;
when the first routing network, via a first server, increases the first baseline reward, send a notification to the second routing network, via a second server, about the increased first baseline reward;
determine whether the second server returns a response to the notification, wherein the response provides an increased second baseline reward exceeding the increased first baseline reward; and
identify, based on the user parameter, one of the first routing network and the second routing network that optimizes the activity for the desired benefit to the user based on the user parameter.

2. The system of claim 1, wherein the memory stores computer-executable instructions that, when executed by the processor, cause the computing device to:
generate a listing with a plurality of routing networks for the activity, wherein the first routing network and the second routing network are prioritized based on the retrieved priorities.

3. The system of claim 1, wherein the memory stores computer-executable instructions that, when executed by the processor, cause the computing device to:
generate a secure session connection between the computing device and a server associated with the first routing network;
receive, from the server associated with the first routing network, and via the secure session connection between the computing device and the server associated with the first routing network, a modification to one or more parameters of the plurality of parameters for the first routing network,
wherein the determining the priorities for the first routing network and the second routing network comprises determining the priorities for the first routing network and the second routing network based at least in part on the modification to the one or more parameters of the plurality of parameters for the first routing network and the modification to the one or more parameters of the plurality of parameters for the second routing network.

4. The system of claim 1, wherein the memory stores computer-executable instructions that, when executed by the processor, cause the computing device to:
determine a data translation for one or more of:
the plurality of parameters for the first routing network, or
the plurality of parameters for the second routing network,
wherein the determining the priorities for the first routing network and the second routing network is based on the data translation.

5. The system of claim 1, wherein the data indicative of the first routing network and the data indicative of a second routing network comprises first user input data indicative of the first routing network and second user input data indicative of the second routing network received at the user device and from the user.

6. The system of claim 1, wherein the memory stores computer-executable instructions that, when executed by the processor, cause the computing device to:
receive, by the computing device and from the user device, a request to use the first routing network; and
in response to receiving the request to use the first routing network, transmit, by the computing device and to a server associated with the first routing network, data indicating the request to use the first routing network.

7. The system of claim 1, further comprising:
the server associated with the second routing network configured to transmit, to the computing device and via the secure session connection between the computing device and the server associated with the second routing network, the modification to the one or more parameters of the plurality of parameters for the second routing network.

8. A method comprising:
receiving, by a computing device and from a user device of a user, data indicative of a first routing network and data indicative of a second routing network;

determining, by the computing device and based on the data indicative of the first routing network, a plurality of parameters for the first routing network;
determining, by the computing device and based on the data indicative of the second routing network, a plurality of parameters for the second routing network;
generating a secure session connection between the computing device and a server associated with the second routing network;
receiving, by the computing device, from the server, and via the secure session connection between the computing device and the server associated with the second routing network, a modification to one or more parameters of the plurality of parameters for the second routing network;
determining, by the computing device, priorities for the first routing network and the second routing network based on first and second baseline rewards, respectively, and preventing first and second servers associated with the first and second routing networks from increasing the first and second baseline rewards, respectively;
storing, by the computing device and at a database, the priorities for the first routing network and the second routing network;
receiving a user parameter, wherein the user parameter is indicative of a desired benefit for the user;
when an activity is detected, retrieving the priorities from the database;
when the first routing network, via a first server, increases the first baseline reward, sending a notification to the second routing network, via a second server, about the increased first baseline reward;
determining whether the second server returns a response to the notification; and
identifying, based on the user parameter, one of the first routing network and the second routing network that optimizes the activity for the desired benefit to the user based on the user parameter.

9. The method of claim 8, wherein the response provides an increased second baseline reward exceeding the increased first baseline reward.

10. The method of claim 8, further comprising:
generating a secure session connection between the computing device and a server associated with the first routing network;
receiving, by the computing device, from the server associated with the first routing network, and via the secure session connection between the computing device and the server associated with the first routing network, a modification to one or more parameters of the plurality of parameters for the first routing network,
wherein the determining the priorities for the first routing network and the second routing network comprises determining the priorities for the first routing network and the second routing network based at least in part on the modification to the one or more parameters of the plurality of parameters for the first routing network and the modification to the one or more parameters of the plurality of parameters for the second routing network.

11. The method of claim 8, further comprising:
determining, by the computing device, a data translation for one or more of:
the plurality of parameters for the first routing network, or
the plurality of parameters for the second routing network,
wherein the determining the priorities for the first routing network and the second routing network is based on the data translation.

12. The method of claim 8 further comprising:
selecting, for the detected activity, one of the plurality of routing networks based on the retrieved priorities.

13. The method of claim 8, further comprising:
receiving, by the computing device and from the user device, a request to use the first routing network; and
in response to receiving the request to use the first routing network, transmitting, by the computing device and to a server associated with the first routing network, data indicating the request to use the first routing network.

14. The method of claim 8, further comprising:
receiving, by the computing device and from the user device, a request to use at least one of the first routing network or the second routing network;
in response to receiving the request to use the at least one of the first routing network or the second routing network, determining whether the request indicates a selection of the first routing network or the second routing network;
in response to determining that the request does not indicate a selection of the first routing network or the second routing network, determining, by the computing device and based on the priorities, to use the second routing network; and
in response to determining to use the second routing network, transmitting, by the computing device and to the server associated with the second routing network, data indicating the request to use the at least one of the first routing network or the second routing network.

15. A non-transitory computer readable medium storing instructions thereon that, when read by a computing device, causes the computing device to:
receive, from a user device of a user, data indicative of a first routing network and data indicative of a second routing network;
determine, based on the data indicative of the first routing network, a plurality of parameters for the first routing network;
determine, based on the data indicative of the second routing network, a plurality of parameters for the second routing network;
generate a secure session connection between the computing device and a server associated with the second routing network;
receive, from the server, and via the secure session connection between the computing device and the server associated with the second routing network, a modification to one or more parameters of the plurality of parameters for the second routing network;
determine priorities for the first routing network and the second routing network based on first and second baseline rewards, respectively, and prevent first and second servers associated with the first and second routing networks from increasing the first and second baseline rewards, respectively;
store, at a database, the priorities for the first routing network and the second routing network;
receive a user parameter, wherein the user parameter is indicative of a desired benefit for the user;
when an activity is detected, retrieve the priorities from the database;
when the first routing network, via a first server, increases the first baseline reward, send a notification to the second routing network, via a second server, about the increased first baseline reward;

determine whether the second server returns a response to the notification, wherein the response provides an increased second baseline reward exceeding the increased first baseline reward; and identify, based on the user parameter, one of the first routing network and the second routing network that optimizes the activity for the desired benefit to the user based on the user parameter.

16. The non-transitory computer readable medium of claim 15, storing instructions thereon that, when read by the computing device, causes the computing device to:

prior to receiving the data indicative of the plurality of routing networks, generate a secure session connection between the computing device and the user device, wherein the receiving the data indicative of the first and second routing networks comprises receiving the data indicative of the first and second routing networks via the secure session connection.

17. The non-transitory computer readable medium of claim 15, storing instructions thereon that, when read by the computing device, causes the computing device to:

generate a secure session connection between the computing device and a server associated with the first routing network;

receive, from the server associated with the first routing network, and via the secure session connection between the computing device and the server associated with the first routing network, a modification to one or more parameters of the plurality of parameters for the first routing network, wherein the determining the priorities for the first routing network and the second routing network comprises determining the priorities for the first routing network and the second routing network based at least in part on the modification to the one or more parameters of the plurality of parameters for the first routing network and the modification to the one or more parameters of the plurality of parameters for the second routing network.

18. The non-transitory computer readable medium of claim 15, storing instructions thereon that, when read by the computing device, causes the computing device to:

determine a data translation for one or more of:

the plurality of parameters for the first routing network, or the plurality of parameters for the second routing network, wherein the determining the priorities for the first routing network and the second routing network is based on the data translation.

19. The non-transitory computer readable medium of claim 15, storing instructions thereon that, when read by the computing device, causes the computing device to:

split the detected activity across the first routing network and the second routing network based on the retrieved priorities.

20. The non-transitory computer readable medium of claim 15, storing instructions thereon that, when read by the computing device, causes the computing device to:

receive, from the user device, a request to use the first routing network; and in response to receiving the request to use the first routing network, transmit, to a server associated with the first routing network, data indicating the request to use the first routing network.

\* \* \* \* \*